(12) United States Patent
Raslambekov

(10) Patent No.: US 11,701,204 B1
(45) Date of Patent: Jul. 18, 2023

(54) SYSTEMS AND METHODS FOR PLANNING AN ORTHODONTIC TREATMENT

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/981,084

(22) Filed: Nov. 4, 2022

(51) Int. Cl.
*G06T 15/00* (2011.01)
*A61C 7/00* (2006.01)

(52) U.S. Cl.
CPC .... *A61C 7/002* (2013.01); *G06T 2207/30036* (2013.01); *G06T 2210/41* (2013.01)

(58) Field of Classification Search
CPC ....... A61B 6/14; A61B 1/0009; A61B 1/0002; A61B 6/032; A61B 6/4085; A61B 5/1111; A61B 1/24; A61B 5/055; G06T 2207/10072; G06T 7/0016; G06T 2200/04; G06T 2207/30036; A61C 9/0046; A61C 7/002
USPC ......................................................... 345/418
See application file for complete search history.

(56) References Cited

U.S. PATENT DOCUMENTS

| | | | | |
|---|---|---|---|---|
| 10,368,719 | B2 * | 8/2019 | Andreiko | A61B 1/00009 |
| 2012/0148972 | A1 * | 6/2012 | Lewis | A61C 7/12 |
| | | | | 433/10 |
| 2014/0247260 | A1 * | 9/2014 | Ghoneima | G06T 19/00 |
| | | | | 345/419 |
| 2014/0272772 | A1 * | 9/2014 | Andreiko | A61C 7/002 |
| | | | | 433/29 |
| 2020/0146775 | A1 | 5/2020 | Wen | |
| 2020/0360109 | A1 | 11/2020 | Gao et al. | |
| 2021/0082184 | A1 | 3/2021 | Claessen et al. | |
| 2021/0200188 | A1 * | 7/2021 | Shah | G06T 19/20 |
| 2022/0051406 | A1 | 2/2022 | Jang | |

OTHER PUBLICATIONS

Wang XM, Ma LZ, Yan MF, Zheng J, Wang M, Hui X. The variation in crown-root morphology of anterior teeth assessed with cone-beam computed tomography. Dental Press Journal of Orthodontics. May 6, 2022;27.*

(Continued)

*Primary Examiner* — Phu K Nguyen
(74) *Attorney, Agent, or Firm* — BCF LLP

(57) ABSTRACT

A method, executable by a processor, of generating an augmented tooth 3D digital model of a given tooth is disclosed. The method includes obtaining a preliminary tooth 3D digital model of the given tooth, and then generating the augmented tooth 3D digital model therefrom by obtaining data of a longitudinal axis of the given tooth, and data indicative of a tooth gingiva segmentation contour between the crown and root portions; determining for each root vertex, a respective new position relative to the longitudinal axis in which the respective new position is defined by a shift distance value and a shift direction vector; moving each of the root vertices to their respective new position by applying their respective shift distance values along their respective shift direction vector to generate the augmented tooth 3D digital model; and storing the augmented tooth 3D digital model for determining an orthodontic treatment for the subject.

20 Claims, 9 Drawing Sheets

(56) References Cited

OTHER PUBLICATIONS

Xu L, Jing R, Xianrui Y, Li W. Inclination of crown and tooth longitudinal axis in cephalometric analysis of normal occlusions. Hua xi kou qiang yi xue za zhi= Huaxi kouqiang yixue zazhi= West China journal of stomatology. Dec. 1, 2016(6):606-10.*

Wang XM, Ma LZ, Wang J, Xue H. The crown-root morphology of central incisors in different skeletal malocclusions assessed with cone-beam computed tomography. Progress in Orthodontics. Dec. 2019;20(1):1-1.*

Magkavali-Trikka P, Halazonetis DJ, Athanasiou AE. Estimation of root inclination of anterior teeth from virtual study models: accuracy of a commercial software. Progress in Orthodontics. Dec. 2019;20(1):1-7.*

* cited by examiner

SYSTEMS AND METHODS FOR PLANNING AN ORTHODONTIC TREATMENT

TECHNICAL FIELD

The present technology relates to systems and methods for planning an orthodontic treatment for a patient, in general; and more specifically, to systems and methods for reconstructing roots of teeth of the patient.

BACKGROUND

Orthodontic treatment plans for treating malocclusion disorders of a subject (or for assessing efficacy of an already ongoing one), typically use various anthropometric parameters associated with a subject's skull, such as those associated with a subject's teeth (including crown portions and root portions thereof), and a subject's gingiva. Such parameters may be, for example, obtained or otherwise, determined through analyzing corresponding image data.

For example, by applying intra-oral scanning techniques, 3D models of the crown portions of the subject's teeth may be obtained, and some of the anthropometric parameters associated therewith may be used for devising an orthodontic treatment. However, for a more efficient and effective orthodontic treatment, it may further be necessary to consider the subject's teeth in their entirety, that is, to determine certain other parameters associated with the root portions as well. These parameters, for a given tooth, may include, for example, a number of root branches of a root portion of the given tooth, dimensions thereof, data indicative of curvature thereof, a location of an associated center of resistance (CR) point within the root portion, and the like. Accordingly, for determining such parameters, additional image data, representative of the root portion of the given tooth may be required, which further may be merged with a 3D model of a crown portion of the given tooth for generating a 3D model thereof.

However, intra-oral scanning techniques cannot be used to obtain the image data representative of the root portion. Therefore, obtaining such image data requires the use of other imaging techniques such as computer tomography (CT), magnetic resonance (MR) imaging, or panoramic radiography, for example.

However, these techniques and the associated apparatus may not be readily available to the practitioners to obtain such data. Further, even if timely access to the additional image data is available, it could be computationally expensive to merge it with the 3D model of the crown portion of the given tooth maintaining certain level of quality of the resulting orthodontic treatment, which may significantly reduce efficiency of such an approach.

Certain prior art approaches have been proposed to tackle the above-identified technical problem, which are directed to reconstructing the root portion of the given tooth of the subject, based on the so obtained 3D model of the crown portion thereof, using a respective predetermined (generic) root portion model.

United States Patent Application Publication No.: 2021/0082,184-A1 filed on Jun. 19, 2020, assigned to Promaton Holding B. V., and entitled "Automated 3D root shape prediction using deep learning methods" discloses a computer-implemented method for automated 3D root shape prediction. The method includes receiving data defining at least one 3D representation of a tooth and processing the data including: transforming at least part of the data into a voxel representation of a crown; a pre-processor providing the representation of the crown to the input of the neural network trained on clinical representations of real teeth; the first neural network generating a representation of a root or a tooth from the crown, wherein the generation of the representation of the root or tooth includes: determining voxel activations in a voxel space of the output of the deep learning network, each activation representing a probability measure defining the probability that a voxel is part of the root or the tooth; and, determining whether a voxel activation is part of the root or the tooth by comparing the voxel activation with a voxel activation threshold value.

United States Patent Application Publication 2022/0051,406-A1 filed on Jul. 27, 2021, assigned to Andrew Timothy Jang, and entitled "Dental imaging mixed reality system" discloses an imaging system. The imaging system accesses first imaging data of a specimen using a first sensor device where the first imaging data comprises volumetric data. The imaging system accesses second imaging data of the specimen using a second sensor device where the second imaging data comprises surface data. The imaging system registers a common anatomical region of the specimen in the first imaging data and the second imaging data and generates a composite image based on the registered common anatomical region. The composite image indicates the volumetric data and the surface data of the specimen.

United States Patent Application Publication 2020/0146,775-A1 filed on Jan. 7, 2020, assigned to Ulab Systems Inc, and entitled "Orthodontic planning systems" discloses systems and methods for treating teeth to correct for malocclusions. This may be accomplished in one variation by receiving a scanned dental model of a subject's dentition, determining a treatment plan having a plurality of incremental movements for repositioning one or more teeth of the subject's dentition, and fabricating one or more aligners correlating to a first subset of the plurality of incremental movements.

United States Patent Application Publication 2020/0360,109-A1 filed on May 12, 2020, assigned to Align Technology Inc, and entitled "Visual presentation of gingival line generated based on 3D tooth model" discloses systems and methods of simulating dental treatments. A method may include capturing a first 2D image of a patient's face, including the patient's teeth, building a parametric 3D model of the patient's teeth and gingiva based on the first 2D image, developing a simulated outcome of a dental treatment of the patient's teeth by rendering the parametric 3D model with the patient's teeth in one or more positions and/or orientations corresponding to the treatment goals of the dental treatment plan, and rendering a second 2D image of the patient's face with gingiva and teeth according to a simulated outcome of the dental treatment plan. The dental treatment plan may include orthodontic and/or restorative elements. The simulated outcome may correspond to estimated outcomes and/or intended outcomes of the dental treatment plan.

SUMMARY

It is an object of the present technology to ameliorate at least some of the inconveniences present in the prior art.

Developers of the present technology have appreciated that, for the purposes of determining the orthodontic treatment, it may be useful to construct an accurate model of a root portion of a given tooth for generating the 3D model thereof, with some assumptions to minimize computational power.

Non-limiting embodiments of the present technology are directed to methods and systems for generating an augmented tooth 3D digital model of a given tooth including a crown portion and a root portion. In certain embodiments, the augmented tooth 3D digital model is generated from a preliminary tooth 3D digital model, the preliminary tooth 3D digital model having been generated based on image data of the crown portion only and including an approximation of the root portion. The augmented tooth 3D digital model includes a more accurate depiction of the root portion compared to the preliminary tooth 3D digital model. Non-limiting embodiments of the present technology may thus permit generation of a 3D model of the subject's arch form including the root portions of the teeth, whilst avoiding a need for image data of the root portion, such as CT/MR scans or a panoramic radiograph, for example.

The augmented tooth 3D digital model may be used, for example, for determining a force to be imposed on the given tooth to cause it to move to a position associated with alignment thereof within a subject's arch form.

The augmented tooth 3D digital model of the given tooth may also be used for modelling so determined movements of the given tooth in the course of the entire orthodontic treatment.

The augmented tooth 3D digital model may also be used for accounting for interactions of the given tooth with other teeth.

Therefore, according to a first broad aspect of the present technology, there is provided a method of generating an augmented tooth 3D digital model of a given tooth of a subject. The method, which is executable by a processor, includes obtaining, by the processor, a preliminary tooth 3D digital model of the given tooth. The preliminary tooth 3D digital model comprises crown vertices representative of a crown surface of a crown portion of the given tooth and root vertices representative of a root surface of a root portion of the given tooth. The crown vertices are obtained from image data of the crown portion of the given tooth, and the root vertices are an approximation of the root portion. The method also includes generating, by the processor, the augmented tooth 3D digital model from the preliminary tooth 3D digital model by: obtaining, by the processor, data of a longitudinal axis of the given tooth; obtaining, by the processor, data indicative of a tooth gingiva segmentation contour between the crown portion and the root portion of the given tooth; and determining, by the processor, for each root vertex, a respective new position relative to the longitudinal axis, the respective new position being defined by a shift distance value and a shift direction vector. The determining comprises, for a given root vertex determining, along a closest distance to the longitudinal axis therefrom, the shift direction vector; determining a longitudinal distance from the given root vertex to the tooth gingiva segmentation contour; and determining based on the longitudinal distance from the given root vertex to the tooth gingiva segmentation contour, the shift distance value of the given root vertex relative to the longitudinal axis. The method also includes moving, by the processor, for each of the root vertices, the given root vertex to the respective new position by applying the shift distance value along the shift direction vector to generate the augmented tooth 3D digital model; and storing, by the processor, the augmented tooth 3D digital model for further use in determining an orthodontic treatment for the subject.

In some implementations of the method, before applying the shift distance value along the shift direction vector, the method further comprises applying a weight to the shift distance value.

In some embodiments of the method, before applying the shift distance value along the shift direction vector, the method further comprises modulating the shift distance value by a constant A and a respective weight value $W_v$, according to the following equation: $D=D_aAW_v$, where $D_a$ is the closest distance from the given root vertex to the longitudinal axis; A is a constant indicative of a magnitude of the shift distance value; and $W_v$ is the respective weight value to be assigned to the given root vertex.

In some implementations of the method, the respective weight value is a first weight value, $W_{v1}$, and is determined according to:

$$W_{v1} = 1 - \frac{D_c}{LB}$$

where $D_C$ is me longitudinal distance from the given root vertex to the tooth gingiva segmentation contour, L is a total length of the given tooth, and B is a predetermined constant indicative of a desired level of a falloff transition between the crown portion and the root portion.

In some implementations of the method, the predetermined constant, B, is predetermined constant based on a type of the given tooth.

In some implementations of the method, the respective weight value is a second weight value, $W_{v2}$, and is determined according to $$W_{v2} = \frac{\frac{1}{1+e^{-D_c}} + 2\pi}{4\pi},$$

where $D_C$ is the longitudinal distance from the given root vertex to the tooth gingiva segmentation contour.

In some implementations of the method, before applying the shift distance value along the shift direction vector to the given root vertex, the method further comprises applying a lesser of a first weight value and a second weight value to the shift distance value, wherein, the first weight value, $W_{v1}$, is determined according to:

$$W_{v1} = 1 - \frac{D_c}{LB},$$

where $D_C$ is the longitudinal distance from the given root vertex to the tooth gingiva segmentation contour, L is a total length of the given tooth, and B is a predetermined constant indicative of a desired level of a falloff transition between the crown portion and the root portion; and wherein the second weight, $W_{v2}$, is determined according to:

$$W_{v2} = \frac{\frac{1}{1+e^{-D_c}} + 2\pi}{4\pi}.$$

In some implementations of the method, the method further comprising generating the preliminary tooth 3D digital model of the given tooth by: obtaining a crown 3D digital model of the crown portion of the given tooth, and merging the crown 3D digital model with a root 3D digital model of the root portion of the given tooth, the root 3D digital model being selected according to a tooth type of the given tooth.

In some implementations of the method, the method further comprising re-distributing the crown vertices and the root vertices of the preliminary tooth 3D digital model uniformly across the crown surface and the root portion.

In some implementations of the method, the method further includes determining the tooth gingiva segmentation contour by identifying, on the preliminary tooth 3D digital model, isolated vertices which are connected to a single mesh element; projecting the isolated vertices onto a surface of a reference cylinder formed around the longitudinal axis of the preliminary tooth 3D digital model; converting the reference cylinder to a reference plane in two-dimensions; generating a curve through the projected isolated vertices in the reference plane; and projecting the curve onto the surface of the preliminary tooth 3D digital model, and determining the projected curve as the tooth gingiva segmentation contour.

In some implementations of the method, the converting the reference cylinder to the reference plane comprises unfolding the reference cylinder.

In some implementations of the method, the converting the reference cylinder to the reference plane comprises: assigning a coordinate to each isolated vertex in a coordinate system of the reference cylinder, the coordinate comprising an angle relative to the longitudinal axis and a distance value of a closest point on the longitudinal axis to the given isolated vertex; and converting the coordinate to a 2D cartesian coordinate system.

According to another broad aspect of the present technology, there is provided a system for generating an augmented tooth 3D digital model of a given tooth of a subject, the system comprising a processor configured to obtain a preliminary tooth 3D digital model of the given tooth, the preliminary tooth 3D digital model comprising crown vertices representative of a crown surface of a crown portion of the given tooth and root vertices representative of a root surface of a root portion of the given tooth, where the crown vertices are obtained from image data of the crown portion of the given tooth, and the root vertices are an approximation of the root portion. The processor is also configured to generate the augmented tooth 3D digital model from the preliminary tooth 3D digital model. To do so, the processor is configured to obtain data of a longitudinal axis of the given tooth; obtain data indicative of a tooth gingiva segmentation contour between the crown portion and the root portion of the given tooth; determine for each root vertex, a respective new position relative to the longitudinal axis, the respective new position being defined by a shift distance value and a shift direction vector, the determining comprising, for a given root vertex: determine along a closest distance to the longitudinal axis therefrom, the shift direction vector; determine a longitudinal distance from the given root vertex to the tooth gingiva segmentation contour; and determine based on the longitudinal distance from the given root vertex to the tooth gingiva segmentation contour, the shift distance value of the given root vertex relative to the longitudinal axis. The processor is further configured to move for each of the root vertices, the given vertex to the respective new position by applying the shift distance value along the shift direction vector to generate the augmented tooth 3D digital model; and store the augmented tooth 3D digital model for further use in determining an orthodontic treatment for the subject.

In some implementations of the system, the processor is configured to, before applying the shift distance value along the shift direction vector, apply a weight to the shift distance value.

In some implementations of the system, the processor is configured to, before applying the shift distance value along the shift direction vector, modulate the shift distance value by a constant A and a respective weight value $W_v$, according to the following equation: $D=D_a A W_v$, where $D_a$ is the closest distance from the given root vertex to the longitudinal axis; A is a constant indicative of a magnitude of the shift distance value; and $W_v$ is the respective weight value to be assigned to the given root vertex.

In some implementations of the system, the respective weight value is a first weight value, $W_{v1}$, and is determined according to $$W_{v1} = 1 - \frac{D_c}{LB}$$

where $D_C$ is the longitudinal distance from the given root vertex to the tooth gingiva segmentation contour, L is a total length of the given tooth, and B is a predetermined constant indicative of a desired level of a falloff transition between the crown portion and the root portion.

In some implementations of the system, the predetermined constant, B, is a predetermined constant based on a type of the given tooth.

In some implementations of the system, the respective weight value is a second weight value, $W_{v2}$, and is determined according to $$W_{v2} = \frac{\frac{1}{1+e^{-D_c}} + 2\pi}{4\pi},$$

where $D_C$ is the longitudinal distance from the given root vertex to the tooth gingiva segmentation contour.

In some implementations of the system, the processor is configured to, before applying the shift distance value along the shift direction vector to the given root vertex, apply a lesser of a first weight value and a second weight value to the shift distance value, wherein the first weight value, $W_{v1}$, is determined according to:

$$W_{v1} = 1 - \frac{D_c}{LB},$$

where $D_C$ is the longitudinal distance from the given root vertex to the tooth gingiva segmentation contour, L is a total length of the given tooth, and B is a predetermined constant indicative of a desired level of a falloff transition between the crown portion and the root portion; and wherein the second weight, $W_{v2}$, is determined according to $$W_{v2} = \frac{\frac{1}{1+e^{-D_c}} + 2\pi}{4\pi}.$$

In some implementations of the system, the processor is further configured to generate the preliminary tooth 3D digital model of the given tooth by obtaining a crown 3D digital model of the crown portion of the given tooth, and merging the crown 3D digital model with a root 3D digital model of the root portion of the given tooth, the root 3D digital model being selected according to a tooth type of the given tooth.

In some implementations of the system, the processor is further configured to re-distribute the crown vertices and the root vertices of the preliminary tooth 3D digital model uniformly across the crown surface and the root surface.

In some implementations of the system, the processor is further configured to determine the tooth gingiva segmentation contour by: identifying, on the preliminary tooth 3D digital model, isolated vertices which are connected to a single mesh element; projecting the isolated vertices onto a surface of a reference cylinder formed around the longitudinal axis of the preliminary tooth 3D digital model; converting the reference cylinder to a reference plane in two-dimensions;

generating a curve through the projected isolated vertices in the reference plane; and projecting the curve onto the surface of the preliminary tooth 3D digital model, and determining the projected curve as the tooth gingiva segmentation contour, In some implementations of the system, the converting the reference cylinder to the reference plane comprises unfolding the reference cylinder.

In some implementations of the system, the converting the reference cylinder to the reference plane comprises assigning a coordinate to each isolated vertex in a coordinate system of the reference cylinder, the coordinate comprising an angle relative to the longitudinal axis and a distance value of a closest point on the longitudinal axis to the given isolated vertex; and converting the coordinate to a 2D cartesian coordinate system.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
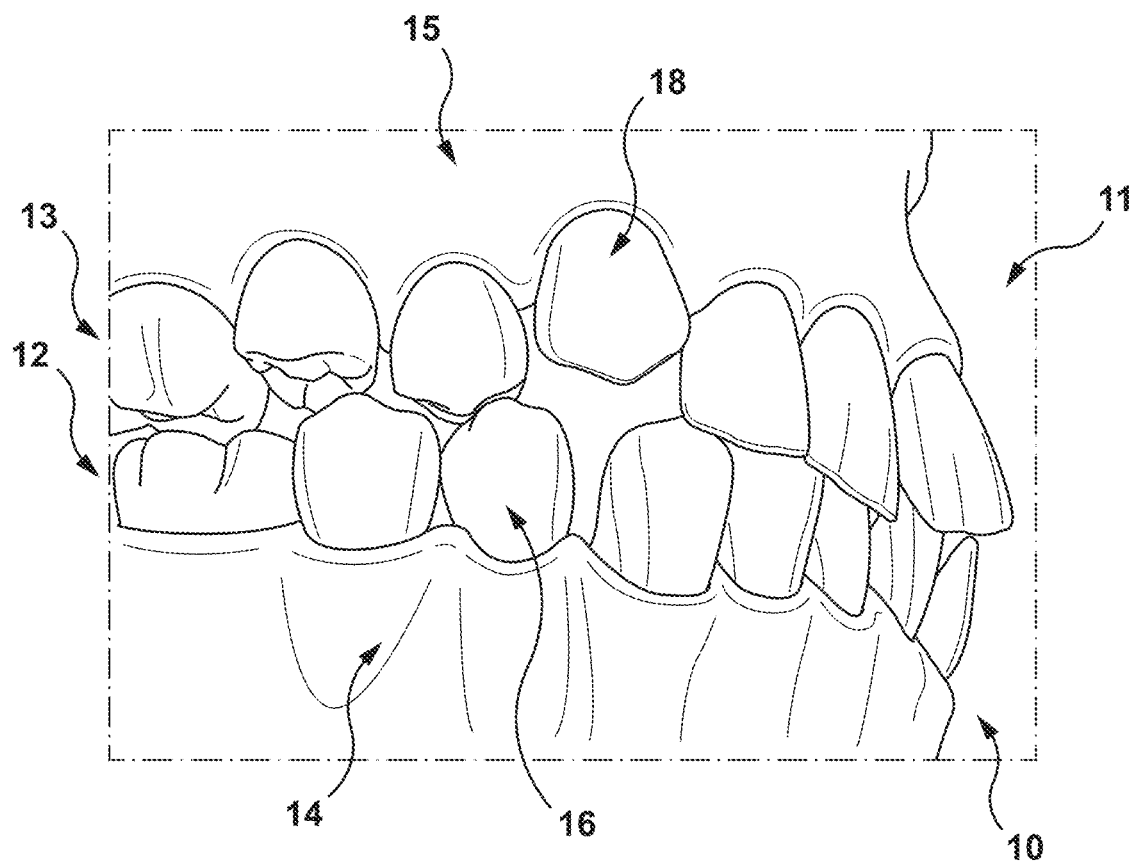
FIG. 1 depicts a perspective view of a lower arch form and an upper arch form of a subject, the lower and upper arch forms including maloccluded teeth and adjacent gingiva of the subject.

It should be noted that, unless otherwise explicitly specified herein, the drawings are not to scale.

DETAILED DESCRIPTION

Certain aspects and embodiments of the present technology are directed to methods of and systems for generating an augmented tooth 3D digital model of a given tooth based on a preliminary tooth 3D digital model. As will be described below, the preliminary tooth 3D digital model is based on a 3D representation of crown and root portions of a tooth of a subject, the root portion being an approximation. The augmented tooth 3D digital model also includes crown and root portions of the given tooth, the root portion being a more accurate depiction of the root of the given tooth. More specifically, certain aspects and embodiments of the present technology include a computer-implemented method for generating the augmented 3D digital model of a given subject's tooth, by determining and applying a shift distance value along a shift direction vector for each of a root vertex of an approximation of a root portion of the tooth.

There are many possible uses of the augmented 3D digital model generated by embodiments of the methods and systems according to the present technology.

The subject may be receiving, or soon to receive, an orthodontic treatment. The augmented tooth 3D digital model may allow for a more accurate planning of the orthodontic treatment, which can in turn improve overall effectiveness and efficacy of the orthodontic treatment.

Based on the augmented 3D digital model of the given subject's anatomical structure, modelling tooth movements of the subject's teeth to determine the orthodontic treatment for the subject may be facilitated. For example, the augmented 3D digital model of the given subject's anatomical structure may be used by the practicing clinician involved in development of the orthodontic treatment for a more accurate monitoring of mutual positions of the subject's anatomical structures when simulating the tooth movements in the course of the orthodontic treatment. Additionally, the augmented 3D digital model may be used for visualizing stages of the so planned orthodontic treatment.

Certain embodiments of the present technology minimize, reduce or avoid some of the problems noted with the prior art. For example, by implementing certain embodiments of the present technology, realistic 3D digital models of the given subject's teeth, including root portions, may be obtained whilst minimizing computational resource consumption on processing the respective 3D digital model thereof, as imaging of the root portions are not required. Therefore, generation of the augmented tooth 3D digital model may achieve accuracy of the given tooth, especially the root portion, without increasing a level of computational resources required, especially when compared to those methods of the prior art that require imaging of the root portion of the given tooth.

In certain non-limiting embodiments of the present technology, the augmented 3D digital model may allow increasing safety and effectiveness of the orthodontic treatment by a more accurate planning thereof. More specifically, using the augmented 3D digital models of the subject's intraoral anatomical structures, for example, for modelling tooth movements of the subject's teeth may allow preventing causing damages thereto during the implementation of the orthodontic treatment. For example, when planning tooth movements of a given tooth including extrusion thereof from an associated gingiva, an augmented 3D digital model of the given tooth may allow preventing exposing a root portion thereof, which may result in increased chances of developing tooth decay or sensitivity in the exposed area in future. In another example, when planning tooth movements of the given tooth including an intrusion thereof in the associated gingiva, the augmented 3D digital model of the given tooth may allow preventing impaction of a crown portion of the given tooth in the associated gingiva, which may result in pressure in the affected area further causing pain and bleeding to the subject.

In certain non-limiting embodiments of the present technology, the effectiveness of the orthodontic treatment may be achieved by a more effective visualization of the planned orthodontic treatment using the so generated augmented 3D digital models of the subject's intraoral anatomical structures. In this regard, the augmented 3D digital models of the subject's intraoral anatomical structures may help the subject to overcome certain fears associated with receiving the forthcoming orthodontic treatment, including, for example, the fear of the unknown, fear of pain, and fear of failure to achieve the planned result of the orthodontic treatment. Further, preventing such anxieties before providing the orthodontic treatment may thus allow enhancing subject's adherence to the orthodontic treatment, thereby increasing its overall effectiveness. The augmented 3D digital models may also help the subject or the clinician choose between different orthodontic treatment options based on cosmetic considerations.

Orthodontic Treatment

With initial reference to FIG. 1, there is depicted a perspective view of a lower arch form 10 and an upper arch form 11 of the subject (not depicted), to which certain aspects and non-limiting embodiments of the present technology may be applied.

As can be appreciated, the lower arch form 10 includes lower teeth 12 and lower gingiva 14; and the upper arch form 11 includes upper teeth 13 and upper gingiva 15. Further, in the depicted embodiments of FIG. 1, positions of at least some of the lower teeth 12 within the lower arch form 10 and those of the upper teeth 13 within the upper arch form 11 may be indicative of certain orthodontic disorders of the subject. For example, at least a given lower tooth 16 and a given upper tooth 18 are misaligned within a respective one of the lower arch form 10 and the upper arch form 11. Further, as the given lower tooth 16 is abnormally embedded within the lower teeth 12 while the given upper tooth 18 abnormally protrudes over opposing ones of the lower teeth 12, the misalignment thereof may affect the bite of the teeth, or, in other words, cause a malocclusion—that is, an irregular spatial relationship—between the lower teeth 12 and the upper teeth 13.

Other malocclusions (not depicted) associated with misalignment of lower teeth 12 relative to each other and the upper teeth 13, according to certain non-limiting embodiments of the present technology, may include, without limitation: overbites, underbites, crossbites, openbites, crowding of some of the lower teeth 12 and the upper teeth 13, midline shift therebetween, and others.

In some non-limiting embodiments of the present technology, for resolving the above-mentioned malocclusions, an orthodontic treatment may be provided to the subject.

In some non-limiting embodiments of the present technology, the orthodontic treatment may comprise applying an orthodontic appliance to the subject's teeth. Generally speaking, the orthodontic appliance may be configured to exert a respective predetermined force onto at least some of the lower teeth 12 and the upper teeth 13—such as the given lower tooth 16 and the given upper tooth 18, causing them to move towards an aligned position, thereby restoring the normal occlusion of the lower teeth 12 relative to upper teeth 13 of the subject. More specifically, in the depicted embodiments of FIG. 1, the orthodontic appliance may be configured to cause the given lower tooth 16 to move outwardly between lower teeth adjacent thereto; and further cause clockwise rotation thereof. Further, the orthodontic appliance may be configured to cause the given upper tooth 18 to move inwardly. In various non-limiting embodiments of the present technology, the orthodontic appliance may comprise orthodontic appliances of different types, shapes, sizes and configurations, such as those including, without limitation, aligners, brackets, multi-strand wires, strips, retainers, and plates.

In some non-limiting embodiments of the present technology, the orthodontic appliance may be selected, in the course of the orthodontic treatment to correct a respective malocclusion. For example, in some non-limiting embodiments of the present technology, the orthodontic appliance may include a biteplate (not depicted) used for correcting the overbites. More specifically, the biteplate may be configured for preventing front ones of upper teeth 13 overlap front ones of the lower teeth 12 for extended periods of time.

Further, in some non-limiting embodiments of the present technology, the orthodontic appliance may include a bitesplint (not depicted), which may be applied to the lower teeth 12 for correcting the crossbites—a lateral misalignment of one of the lower arch form 10 and the upper arch form 11 resulting, for example, in buccal surfaces of some of the upper teeth 13 overlapping lingual surfaces of opposing ones thereof to the lower teeth 12. To that end, the bitesplint may be configured for preventing the subject from biting completely, which may further allow correcting the crossbites.

In yet other embodiments of the present technology, the orthodontic appliance may come in different types, shapes, sizes and configurations, such as, without limitation, multi-strand wires, strips, retainers, and plates.

Figure 2:
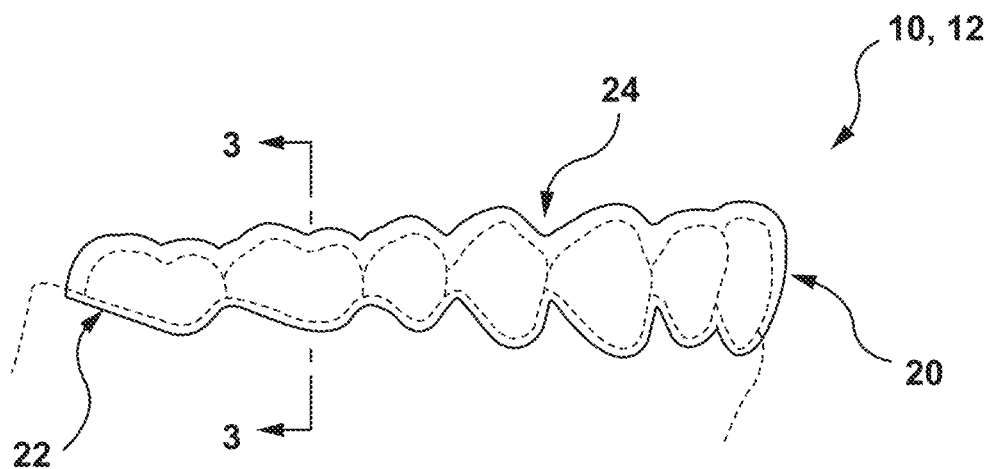
FIGS. 2 and 3 depict a side view and a cross-sectional view through line 3-3, respectively, of a dental appliance applied to the lower arch form of FIG. 1 and that may be configured to treat the malocclusions of the subject's teeth, in accordance with certain non-limiting embodiments of the present technology.
Figure 3:
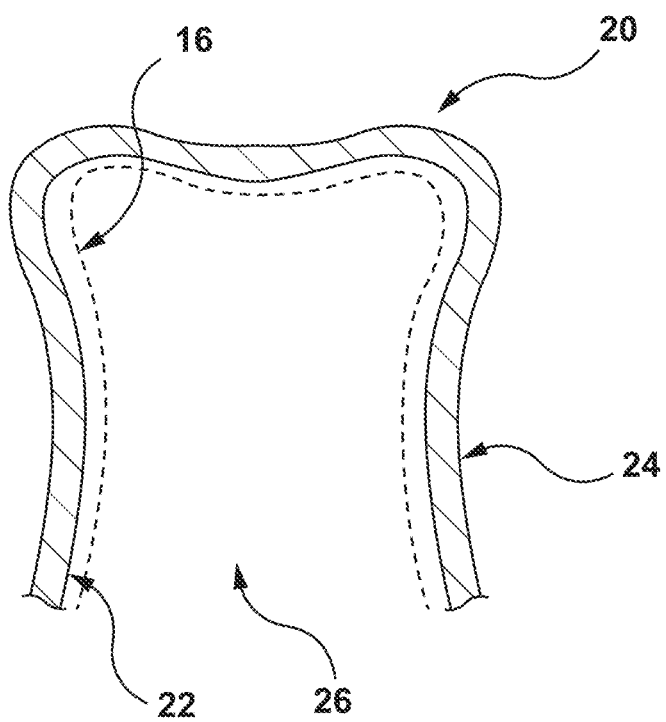

In specific non-limiting embodiments of the present technology, the orthodontic appliance may include at least one aligner. With reference to FIGS. 2 and 3, there is depicted an aligner 20 applied to at least some of the lower teeth 12 (depicted with dashed lines in FIGS. 2 and 3), in accordance with certain non-limiting embodiments of the present technology. The aligner 20 comprises an inner surface 22 and an outer surface 24. The inner surface 22 defines a channel 26, which is configured, in some non-limiting embodiments of the present technology, for receiving crown portions of at least some of the lower teeth 12, such as the given lower tooth 16 (depicted with dashed lines in FIG. 3). However, in other non-limiting embodiments of the present technology, the channel 26 of the aligner 20 may be configured to receive crown portions of all of the lower teeth 12. At least one edge (also referred to herein as an "open edge") of the channel 26 is shaped for following a gum line (not depicted) along the lower gingiva 14.

It will be appreciated that, in accordance with certain non-limiting embodiments of the present technology, the aligner 20 may be used for treating different teeth malocclusions, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 20 to the lower teeth 12 may further include applying specific attachments thereto.

As may become apparent, the aligner 20 may be designed in such a way that its inner surface 22 is configured to impose respective forces on one or more of the lower teeth 12 to obtain a desired position of the lower teeth 12 at a given stage of the orthodontic treatment.

Needless to say that, although in the depicted embodiments of FIGS. 2 and 3, the aligner 20 is configured to be applied onto the lower teeth 12, in other non-limiting embodiments of the present technology, a respective configuration of the aligner 20 may be applied to the upper teeth 13 of the subject for treating misalignment of at least some thereof—such as the given upper tooth 18. By so doing, the desired occlusion between the lower teeth 12 and the upper teeth 13 may be attained.

According to certain non-limiting embodiments of the present technology, the aligner 20 may be made of a polymer, such as a thermoplastic material. In other non-limiting embodiments of the present technology, the aligner 20 may be made of poly-vinyl chloride (PVC). In yet other non-limiting embodiments of the present technology, the aligner 20 may be made of polyethylene terephthalate glycol (PETG). Other suitable materials can also be used to form the aligner 20.

In some non-limiting embodiments of the present technology, the aligner 20 may be manufactured using additive manufacturing techniques, such as 3D printing techniques where the aligner 20 is formed by printing according to a pre-generated 3D digital model thereof.

In other non-limiting embodiments of the present technology, the aligner 20 may be produced by a thermoforming process where (1) an unfinished aligner is produced, using a preform, on a respective aligner mold (not depicted) associated with a respective stage of the orthodontic treatment, which is configured to shape the inner surface 22 of the aligner 20; and (2) the unfinished aligner is cut along a predetermined cut line to remove excess material therefrom, thereby producing the aligner 20, the predetermined cut line defining the at least one edge of the channel 26 of the aligner 20.

In specific non-limiting embodiments of the present technology, the aligner 20 may be manufactured in accordance with one or more methods described in a co-owned U.S. patent application Ser. No. 17/143,074 filed on Jan. 6, 2021, entitled "SYSTEMS AND METHODS FOR FORMING A DENTAL APPLIANCE," the content of which is incorporated herein by reference in its entirety.

As it may become apparent, to produce the aligner 20 for achieving the desired occlusal relationship between the lower teeth 12 and the upper teeth 13 during the orthodontic treatment, the tooth movements of subject's teeth to which the aligner 20 is to be applied to should be carefully planned, based on respective 3D digital models (such as 3D meshes, as will be described below) of the lower arch form 10 and the upper arch form 11, for example, to determine respective forces applied to the subject's teeth during respective stages of the orthodontic treatment. For example, the respective 3D digital models of each one of the lower arch form 10 and the upper arch form 11 of the subject may be generated using intra-oral scanning techniques.

As will be described in greater detail below, the 3D digital models generated by using intra-oral scanning techniques may represent the crown portion only and not the root portion, or be otherwise incomplete (e.g., portions of the crown portion of the tooth may be missing).

System

Figure 4:
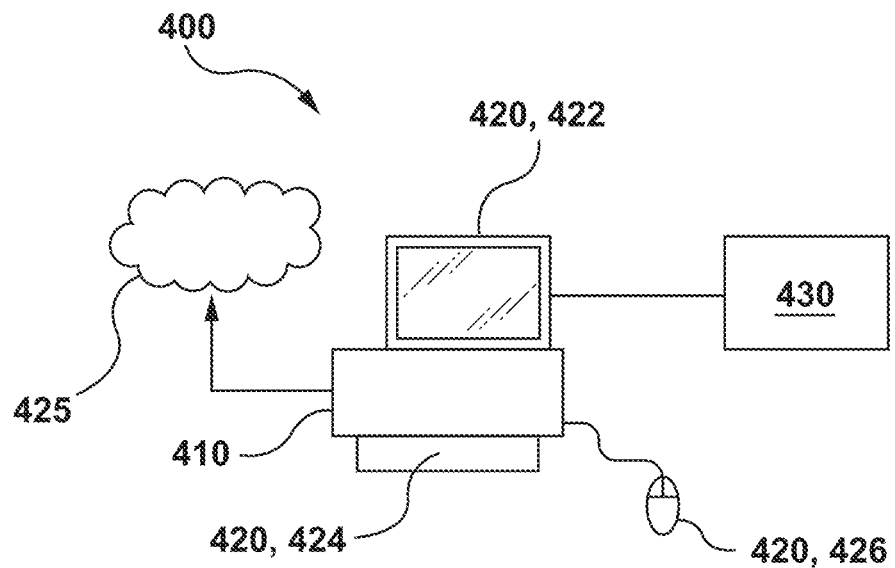
FIG. 4 depicts a schematic diagram of a system for generating augmented 3D digital models of teeth of a subject, such as the teeth present in FIG. 1, in accordance with certain embodiments of the present technology.
Figure 5:
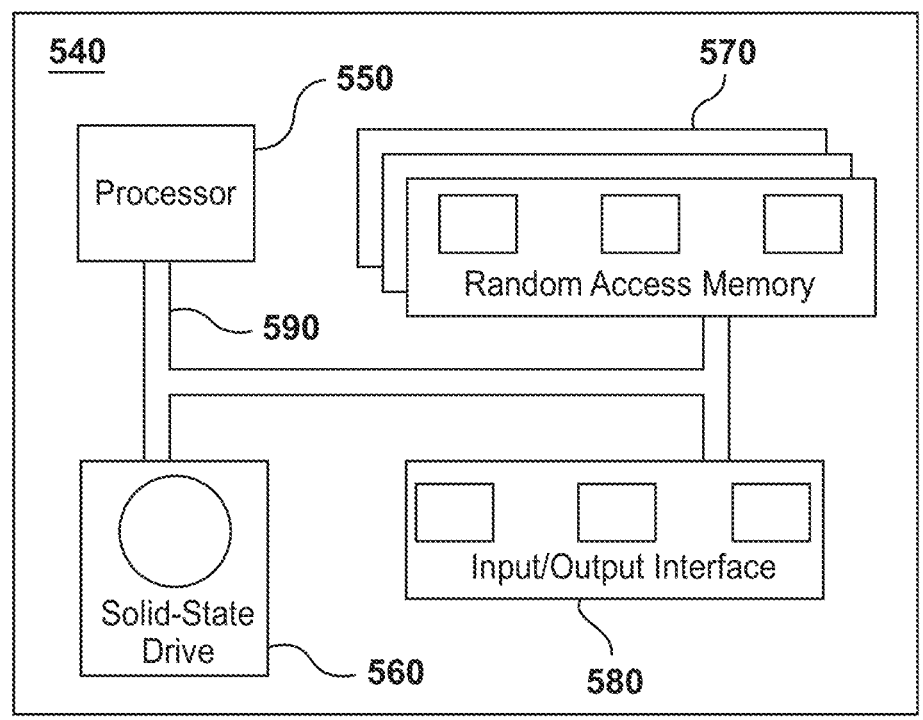
FIG. 5 depicts a schematic diagram of a computing environment of the system of FIG. 4, in accordance with certain embodiments of the present technology.

With reference to FIGS. 4 and 5, there is depicted a schematic diagram of a system 400 suitable for generating an augmented 3D digital model of the given subject's intraoral anatomical structure, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to determine, based on image data associated with the subject, such as the respective 3D digital models of the given subject's intraoral anatomical structure, the respective augmented 3D digital model thereof. In additional non-limiting embodiments of the present technology, the computer system 410 may further be configured to determine the orthodontic treatment for the subject using the respective augmented 3D digital model, as will be described below.

To that end, in some non-limiting embodiments of the present technology, the computer system 410 may be configured to receive the image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology.

Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data of the given subject's intraoral anatomical structure from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In some non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the lower teeth 12 and the periodontium (not depicted) of the subject. In certain non-limiting embodiments of the present technology, the image data may include, for example, one or more of: (1) images of external surfaces of respective crown portions of the lower teeth 12, (2) images of an external surface of the periodontium including those of the lower gingiva 14, the alveolar mandibular bone (not depicted), and images of superficial blood vessels and nerve pathways associated with the lower teeth 12; and (3) images of an oral region. By doing so, the imaging device 430 may be configured, for example, to capture image data of the lower arch form 10 of the subject. In another example, the imaging device 430 may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the at least one of the lower arch form 10 and the upper arch form 11 of the subject.

In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold (not depicted) representing the given configuration of the at least one of the lower arch form 10 and the upper arch form 11 associated with the respective stage of the orthodontic treatment. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from DENTAL WINGS, INC. of 2251, ave Letourneux, Montreal (QC), Canada, H1V 2N9. It should be expressly understood that the desktop scanner can be implemented in any other suitable equipment.

In yet other non-limiting embodiments of the present technology, the imaging device 430 can comprise a 3D laser scanner enabling to obtain a respective point cloud 3D digital model of the at least one of the lower arch form 10 and the upper arch form 11—such as by scanning the mold thereof and thus registering three-dimensional coordinates of points representative of the surface of the mold.

In a specific non-limiting example, the 3D laser scanner can be of one of the types available from LASER DESIGN of 5900 Golden Hills Drive, Minneapolis, Minn. 55416. It should be expressly understood that the desktop scanner can be implemented in any other suitable equipment.

In yet other non-limiting embodiments of the present technology, the imaging device 430 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct 3D digital models of the following regions of the subject's anatomy: dental (teeth and gum, for example); oral and maxillofacial region (mouth, jaws, and neck); and ears, nose, and throat ("ENT").

In a specific non-limiting example, the CBCT scanner can be of one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 410 may be configured for processing of the received image data. The resulting image data of the lower arch form 10 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (for example, STL, OBJ, PLY, DICOM, and various software-specific, proprietary formats). Any image data file format is included within the scope of the present technology. For implementing functions described above, the computer system 410 may further comprise a corresponding computing environment.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (for example, a Peripheral Component Interconnect (PCI) bus, a universal serial bus (USB), IEEE 1394 "Firewire" bus, a Small Computer System Interface (SCSI) bus, a Serial AT Attachment (Serial-ATA) bus, an Aeronautical Radio Incorporated (ARINC) bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

Thus, in some non-limiting embodiments of the present technology, the computing environment 540 may further include a graphics processing unit (GPU, not depicted) configurable to render graphics for display on a screen of the system 400, such as a screen 422, in accordance with instructions of the processor 550.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the at least one interface device 420 being in communication with the input/output interface 580. In the embodiment of FIG. 4, the at least one interface device is the screen 422. In other non-limiting embodiments of the present technology, the at least one interface device 420 may be a monitor, a speaker, a printer or any other device for providing an output in any form such as an image form, a written form, a printed form, a verbal form, a 3D model form, or the like.

In the depicted embodiments of FIG. 4, the at least one interface device 420 also comprises a keyboard 424 and a mouse 426 for receiving input from the user of the system 400. In other non-limiting embodiments of the present technology, the at least one interface devices 420 may be configured for providing an input to the computer system 410; and can thus further include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

As alluded to above, according to certain non-limiting embodiments of the present technology, the processor 550 may be configured to execute a method for generating an augmented tooth 3D digital model based on: (1) receive the respective 3D digital model of the given subject's teeth; (2) apply to the respective 3D digital model one or more techniques to obtain a respective preliminary 3D digital model, the preliminary 3D digital model including representations of a crown portion of the given tooth as well as an approximated root portion; (3) apply a shift distance value along a shift direction vector to each vector of the approximated root portion of the preliminary 3D digital model to generate the respective augmented 3D digital model; and (4) one or more of: (i) determine, from the respective augmented 3D digital model, the orthodontic treatment for the subject, (ii) save the augmented 3D digital model in a memory of the computer system, and (iii) cause a display of the augmented 3D digital model.

The preliminary 3D digital model may be based on image data of the crown portion of the given tooth or of the arch form including the given tooth. The image data may originate from various sources. For example, in some embodiments, the image data may be acquired and/or provided by the imaging device 430.

Generating an Augmented Tooth 3D Digital Model

Figure 14:
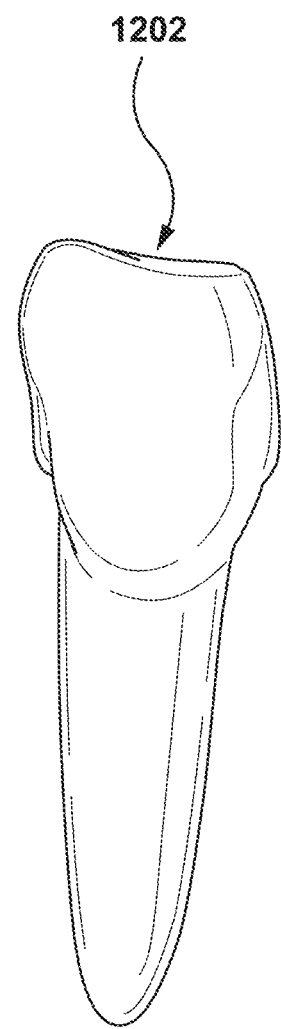
FIG. 14 depicts a schematic diagram of an augmented 3D digital model of the given tooth of the subject generated from the preliminary 3D digital model of the given tooth of the subject of FIG. 8, according to certain non-limiting embodiments of the present technology.
Figure 15:
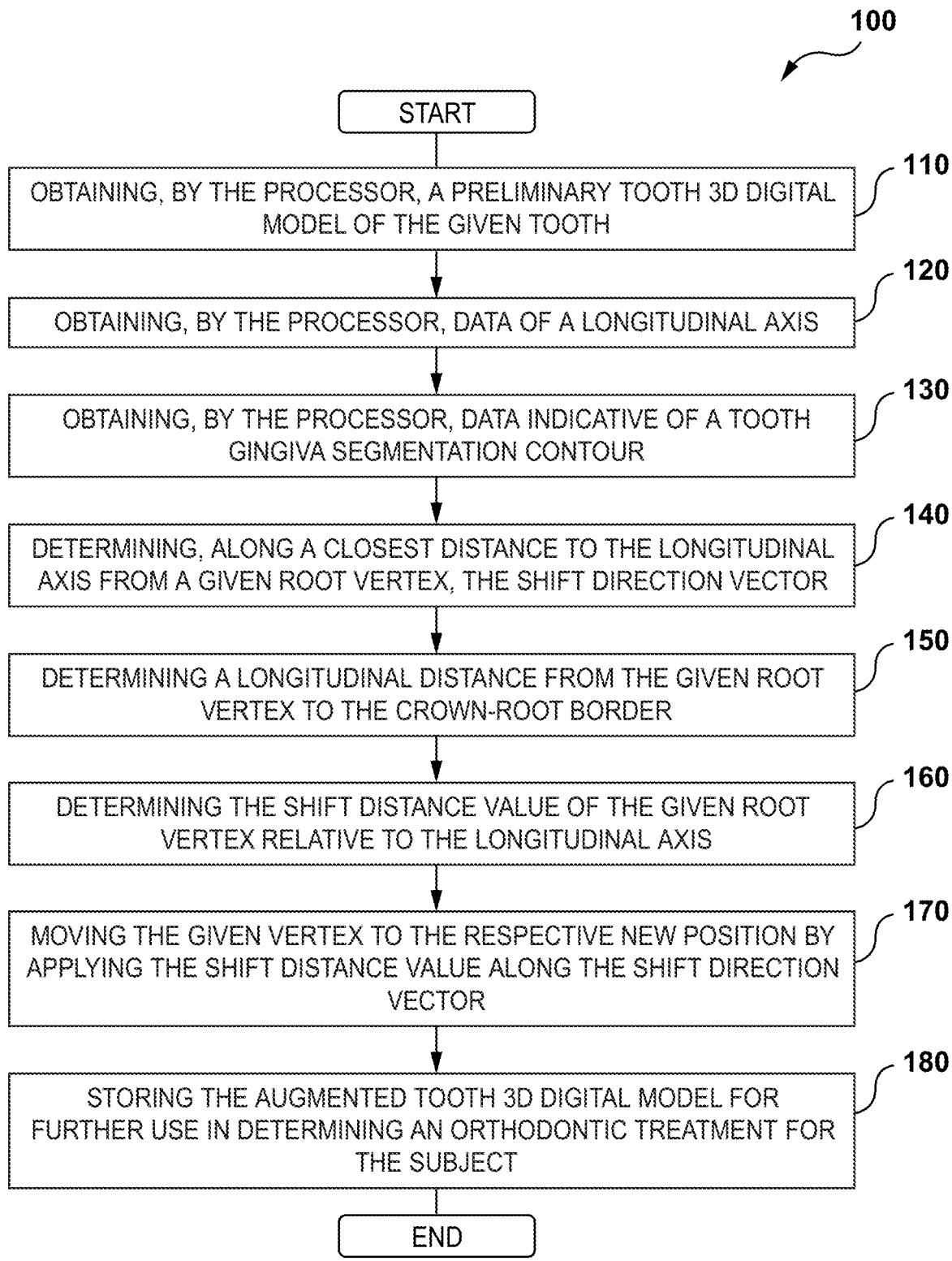
FIG. 15 depicts a flowchart of a method for generating the augmented 3D digital model of FIG. 14, according to certain non-limiting embodiments of the present technology.

With reference to FIGS. 6 to 15, a method 100, depicted in FIG. 15, for generating the augmented tooth 3D digital model will now be described in greater detail. According to certain non-limiting embodiments of the present technology, the method 100 can be executed by the processor 550 of the computer system 410.

Figure 9:
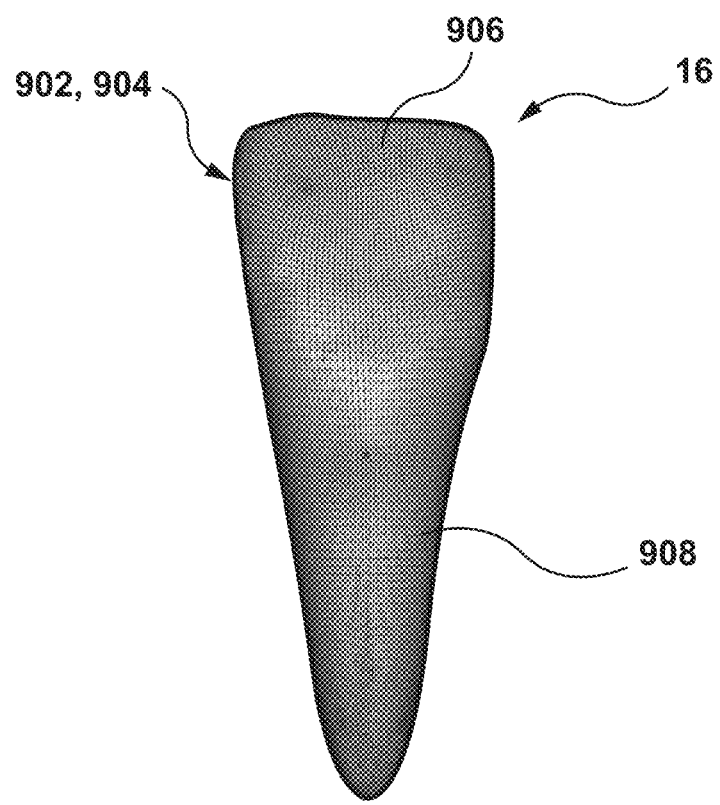
FIG. 9 depicts a schematic diagram of the preliminary 3D digital model of the given tooth of the subject generated by the processor of FIG. 5 based on the 3D digital model of the crown portion of FIG. 7 and the 3D digital model of the root portion of FIG. 8, according to certain non-limiting embodiments of the present technology.

Step 110: Obtaining, by the Processor, a Preliminary Tooth 3D Digital Model of the Given Tooth The method 100 begins at step 110 by obtaining a preliminary tooth 3D digital model of a tooth, such as the given lower tooth 16. An example preliminary tooth 3D digital model 902 of a given tooth is illustrated in FIG. 9. The preliminary tooth 3D digital model 902, in certain embodiments, includes a crown portion 906 and a root portion 908 of the given tooth 16 which are also referred to herein as preliminary crown 3D digital model and preliminary root 3D digital model, respectively.

In some non-limiting embodiments of the present technology, the preliminary tooth 3D digital model 902 of the given lower tooth 16 is obtained from imaging of both the crown portion and the root portion of the given tooth. In this respect, the preliminary tooth 3D digital model 902 can be obtained from another processor, such as a processor of an imaging device, such as the imaging device 430. The processor 550 may be configured to receive the preliminary tooth 3D digital model 902 directly from the imaging device 430.

However, in other non-limiting embodiments of the present technology, the preliminary tooth 3D digital model 902 is based only on image data of the crown portion of the given tooth or a model of the crown portion of the given tooth. In these embodiments, the processor 550 may obtain image data or the model of the crown portion of the given tooth from an intra-oral scanner, for example. In other embodiments, the image data of the crown portion of the given tooth or the model of the crown portion of the given tooth may be derived from image data of the arch form of the subject, including the given tooth, and from which the image and/or model of the given tooth is isolated. It can thus be said that the preliminary tooth 3D digital model 902 of the given tooth may be derived from a 3D digital model of a current configuration of an arch form of the subject, the arch form including the crown portion of the given tooth.

Figure 6:
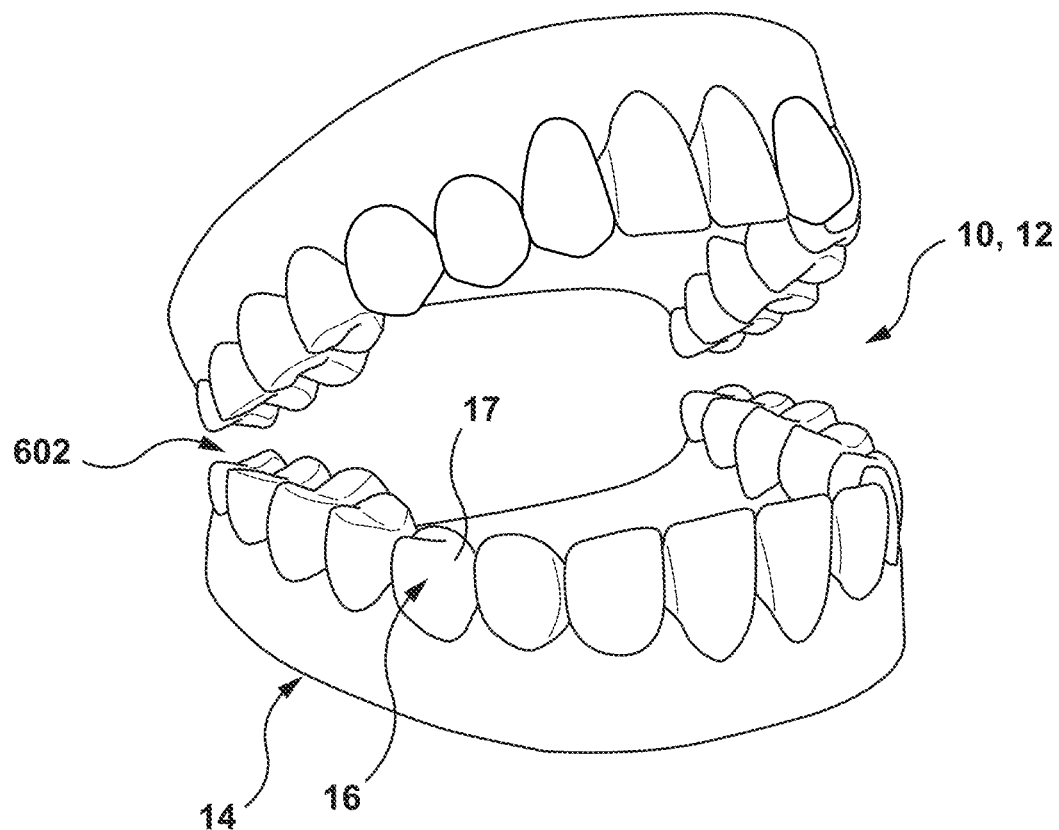
FIG. 6 depicts a 3D digital model of the subject's lower arch form of FIG. 1 which can be used, by a processor of FIG. 5, to generate a preliminary 3D digital model of a given tooth, the preliminary 3D digital model including a crown portion and a root portion of the given tooth, in accordance with certain non-limiting embodiments of the present technology.

In this respect, and with reference to FIG. 6, there is schematically depicted a perspective view of an arch form 3D digital model 602 of the lower arch form 10 used, by the processor 550, for generating the preliminary tooth 3D digital model 902 of the given tooth, such as the given lower tooth 16, in accordance with certain non-limiting embodiments of the present technology. The arch form 3D digital model 602 includes representations of the crown portions 17 of the teeth in the lower arch form 10 as well as the gingiva 14 adjacent the teeth.

In some non-limiting embodiments of the present technology, the processor 550 may be configured to receive, from the imaging device 430, the arch form 3D digital model 602. The arch form 3D digital model 602 may comprise a respective plurality of mesh elements (not depicted) representative of a surface of the lower arch form 10. For example, the imaging device 430 can be configured to generate the plurality of mesh elements including, without limitation, triangular mesh elements, quadrilateral mesh elements, convex polygonal mesh elements, or even concave polygonal mesh elements, as an example, without departing from the scope of the present technology.

Figure 7:
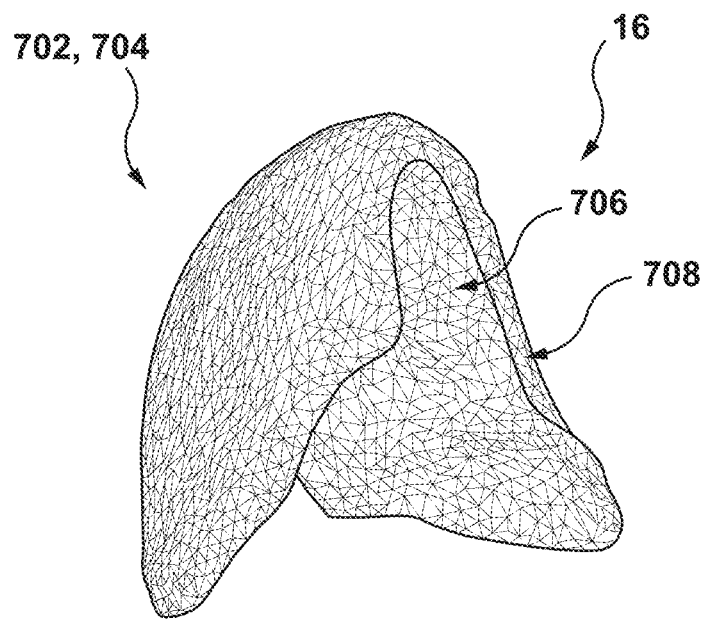
FIG. 7 depicts the crown portion of the preliminary 3D digital model of the given tooth, generated by the processor of FIG. 5, based on the 3D digital model of FIG. 6, in accordance with certain non-limiting embodiments of the present technology.

Further, to generate the preliminary tooth 3D digital model 902, in some non-limiting embodiments of the present technology, the processor 550 may be configured to perform one or more of: (1) isolate the given lower tooth 16 from adjacent teeth 12 in the arch form 10, (2) isolate the given lower tooth 16 from adjacent gingiva 14 in the arch form 10, and (3) isolate the teeth of the arch form 10 including the given tooth 16 from adjacent gingiva 14. In certain embodiments, a crown 3D digital model 702 of the crown portion 17 of the given lower tooth 16 is obtained after the isolation, which is schematically depicted in FIG. 7.

In some non-limiting embodiments of the present technology, the processor 550 may be configured to, based on the 3D digital model of a crown portion of the given tooth, reconstruct a 3D digital model of an approximation of the root portion of the given lower tooth 16; and merge the 3D digital model of the crown portion and the 3D digital model of the root portion of the given lower tooth 16, thereby generating the preliminary tooth 3D digital model 902.

How the processor 550 can be configured to isolate the crown 3D digital model 702 is not limited; and, in some non-limiting embodiments of the present technology, the processor 550 can be configured to apply, to the arch form 3D digital model 602, one or more automatic tooth segmentation approaches described in a co-owned U.S. Pat. No. 10,950,061-B1 issued on Mar. 16, 2021, entitled "SYSTEMS AND METHODS FOR PLANNING AN ORTHODONTIC TREATMENT", content of which is incorporated herein by reference in its entirety.

More specifically, in U.S. Pat. No. 10,950,061, to generate the crown 3D digital model 702 associated with the given lower tooth 16 (FIG. 7), the processor 550 may be configured to: (i) acquire the arch form 3D digital model 602 of the lower arch form 10 of the subject, the arch form 3D digital model 602 comprising a defined portion forming part of a surface of the given lower tooth 16, and at least one undefined portion not forming part of the surface of the given lower tooth 16; the arch form 3D digital model 602 comprising the plurality of mesh elements having a plurality of vertices comprising: constrained vertices associated with the defined portion, each constrained vertex having a normal constrained vertex vector; unconstrained vertices initially associated with the undefined portion, each unconstrained vertex having a normal unconstrained vertex vector; (ii) generate a set of confirmed constrained vertices 704, including the constrained vertices associated with the defined portion, for providing the crown 3D digital model 702 of the crown portion 17 of the given lower tooth 16 by: (iii) iteratively, for a given constrained vertex, identifying at least one associated unconstrained vertex which is adjacent to the given constrained vertex in the plurality of mesh elements; (iv) determining an angular difference between the normal constrained vertex vector of the given constrained vertex and the normal unconstrained vertex vector of the at least one associated unconstrained vertex; (v) in response to the angular difference being equal to or below a predetermined threshold value: identifying the at least one associated unconstrained vertex to be a constrained vertex associated with the defined portion for inclusion in the set of confirmed constrained vertices 704; (vi) in response to the angular difference being above the predetermined threshold value: identifying the at least one associated unconstrained vertex to be an unconstrained vertex associated with the undefined portion for exclusion from the set of confirmed constrained vertices 704. Thus, the crown 3D digital model 702 includes crown vertices which are representative of a crown surface of the crown portion 17 of the given lower tooth 16.

In additional non-limiting embodiments of the present the present technology, the processor 550 may further be configured to perform a smoothing operation on the set of confirmed constrained vertices 704 defining the crown 3D digital model 702 to fill in gaps therein—such as a given gap 706, formed as a result of isolating the crown 3D digital model 702 in the arch form 3D digital model 602.

To that end, according to specific non-limiting embodiments of the present technology, the processor 550 may be configured to apply one or more Harmonic functions to the crown 3D digital model 702 of the given lower tooth 16, thereby restoring a smooth surface thereof within the given gap 706.

In the context of the present specification, the term "Harmonic function" relates to the field of mathematical physics and denotes a function that satisfies Laplace's equation. Accordingly, applying the one or more Harmonic functions for restoring the smooth surface within the given gap 706 of the crown 3D digital model 702 may be associated with setting certain boundary conditions.

Thus, according to some non-limiting embodiments of the present technology, the boundary conditions for the one or more Harmonic functions may comprise vertex coordinates and respective vertex normal vectors (not separately depicted in FIG. 7) defined at respective vertices of the set of confirmed constrained vertices 704, which are located at an edge 708 of the given gap 706 of the crown 3D digital model 702. By doing so, the processor 550, using the one or more Harmonic functions, can be said to "patch" the given gap 706 within the crown 3D digital model.

Also, according to some non-limiting embodiments of the present technology, the processor 550 may be configured to re-mesh the surface of the crown 3D digital model 702 to redistribute the set of confirmed constrained vertices 704 uniformly therewithin.

Further, as noted above, the processor 550 is also configured to generate the 3D digital model of the root portion 908 based on the crown 3D digital model 702. It is not limited how the processor 550 may be configured to generate the 3D digital model of the root portion. In some non-limiting embodiments of the present technology, the processor 550 may be configured to generate the 3D digital model of the root portion based on reference data associated with the given lower tooth 16, such as by applying one or more approaches described in a co-owned U.S. Pat. No. 11,026,767-B1 issued Jun. 8, 2021 entitled "SYSTEMS AND METHODS FOR PLANNING AN ORTHODONTIC TREATMENT", content of which is incorporated herein by reference in its entirety.

More specifically, to generate the 3D digital model of the root portion, the crown 3D digital model 702 associated with the given lower tooth 16, the processor 550 may be configured to: (i) acquire a 3D representation of the crown portion 17 of the given lower tooth 16, the 3D representation of the crown portion 17 being associated with a predetermined longitudinal tooth axis; (ii) generate a 3D representation of the root portion of the given tooth by executing the steps of determining a location of a root apex of the 3D representation of the root portion relative to the predetermined longitudinal tooth axis, the determining being based on a predetermined instruction for locating the root apex; generating, in a reference plane dissecting the predetermined longitudinal tooth axis and based on the 3D representation of the crown portion 17, a closed curve on the 3D representation of the crown portion 17, segmenting the closed curve into a plurality of sub-curves; and for each one of the plurality of sub-curves, based on the root apex and the predetermined longitudinal tooth axis, generating a respective segment of a plurality of segments of the 3D representation of the root portion, the plurality of segments of the 3D representation of the root portion comprising a totality thereof (iii) merge the 3D representation of the crown portion 17 with the 3D representation of the root portion, thereby generating the 3D representation of the given tooth.

More specifically, in some non-limiting embodiments of the present technology, the reference data associated with the given lower tooth 16 may include, without limitation, at least one of a number of root branches of the root portion; approximate overall dimensions of the given lower tooth 16 including those of the crown portion 17 and the root portion thereof. Also, in some non-limiting embodiments of the present technology, the reference data associated with the given lower tooth 16 may further include a base parametric 3D model of the root portion; and the processor 550 can be configured to generate the 3D digital model of the root portion of the given lower tooth 16 based on the base parametric model.

Figure 8:
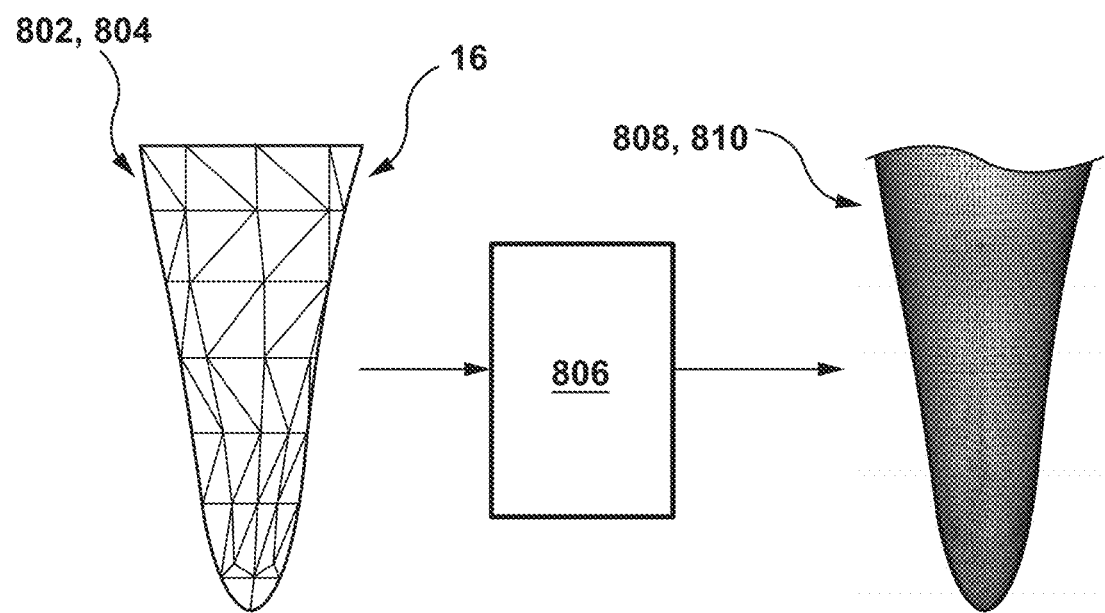
FIG. 8 depicts a schematic diagram of a process for generating, by the processor of FIG. 5, a 3D digital model of a root portion of the given tooth of FIG. 7 using the crown portion of FIG. 7, the 3D digital model of a root portion to be used in the preliminary 3D digital model of the given tooth, according to certain embodiments of the present technology.

With reference to FIG. 8, there is depicted a base parametric 3D digital model 802 for the root portion of the given lower tooth 16 used, by the processor 550, for generating a root 3D digital model 808 (i.e., the preliminary root 3D digital model 902), in accordance with certain non-limiting embodiments of the present technology. In some embodiments, the base parametric 3D digital model 802 may correspond to the preliminary root 3D digital model (i.e., may correspond to the model that is being merged with the preliminary crown 3D digital model).

According to certain non-limiting embodiments of the present technology, the base parametric 3D digital model 802 may comprise a plurality of coarse root mesh elements 804 that may further be smoothed, by the processor 550, thereby generating the root 3D digital model 808 of the root portion of the given lower tooth 16.

In some non-limiting embodiments of the present technology, the smoothing may be based on a subdivision algorithm 806, to which the processor 550 may be provided access. Broadly speaking, the subdivision algorithm 806 may be configured to iteratively subdivide each one of the plurality of coarse root mesh elements 804 into smaller ones of a plurality of root mesh elements 810 indicative of a desired level of granularity of the root 3D digital model 808.

In some non-limiting embodiments of the present technology, the processor 550 may be configured to iteratively apply the subdivision algorithm 806 until a distribution of vertices of the plurality of root mesh elements 810 along the root 3D digital model 808 corresponds to that of the set of confirmed constrained vertices 704 associated with the crown 3D digital model 702 depicted in FIG. 7.

In specific non-limiting embodiments of the present technology, the subdivision algorithm 806 may be a Catmull-Clark subdivision algorithm; however, in other non-limiting embodiments of the present technology, the subdivision algorithm 806 may further include a Doo-Sabin subdivision algorithm, a Loop subdivision algorithm, a Midedge subdivision algorithm, and a Kobbelt subdivision algorithm, as an example.

It should further be noted that the processor 550 may be configured to verify, at each iteration of applying the subdivision algorithm 806, if dimensions of the root 3D digital model 808 correspond to the approximate overall dimensions of the root portion of the given lower tooth 16 (such as a length thereof, for example) received as part of the reference data thereof, and adjust discrepancies therebetween.

Thus, having generated the root 3D digital model 808, the processor 550 is configured to merge the root 3D digital model 808 with the crown 3D digital model 702 to generate the preliminary tooth 3D digital model 902 of the given lower tooth 16, a schematic diagram of which is depicted in FIG. 9, in accordance with certain non-limiting embodiments of the present technology. Being that the root portion of the preliminary tooth 3D digital model 902 is an approximation, root vertices of the preliminary tooth 3D digital model 902 are also approximations.

According to some non-limiting embodiments of the present technology, after merging the crown 3D digital model 702 and the root 3D digital model 802, the processor 550 may additionally be configured to smooth a surface of the tooth 3D digital model 902 using one or more Harmonic functions as described above.

Thus, the processor 550 is configured to obtain the preliminary tooth 3D digital model 902.

The method 100 then proceeds to step 120.

Step 120: Obtaining, by the Processor, Data of a Longitudinal Axis

The method 100 continues with step 120, by obtaining data of a longitudinal axis 914 of the given tooth, such as the lower tooth 16.

Certain non-limiting embodiments of the present technology are based on a premise that the preliminary crown 3D digital model 702 may be pre-associated with the longitudinal axis 914, which defines a direction for generating the root 3D representation. In some non-limiting embodiments of the present technology, the longitudinal axis 914 may be predetermined, by the processor 550, based on data indicative of specific anatomical features of a crown portion of the given tooth which includes, without being limited to: lobes, developmental grooves, and marginal ridges, as an example. In these embodiments, the data indicative of the specific anatomical features of the crown portion may be part of the reference data indicative of the given lower tooth 16 and include data of spatial positions and dimensions of at least some of the above-listed anatomical features of the crown portion averaged over the sample of subjects.

In specific non-limiting embodiments of the present technology, the longitudinal axis 914 may be a central tooth axis associated with the given lower tooth 16 having been determined, by the processor 550, based on the preliminary crown 3D digital model 702 as described in a co-owned U.S. Pat. No. 10,856,954-B1 issued on Dec. 8, 2020 entitled "SYSTEMS AND METHODS FOR DETERMINING TOOTH CENTER OF RESISTANCE", the content of which is hereby incorporated by reference in its entirety.

In other embodiments, the longitudinal axis 914 of the given tooth is obtained by any other manner, such as using the root portion 908 of the preliminary tooth 3D digital model 902.

The step 120 thus terminates.

Step 130: Obtaining, by the Processor, Data Indicative of a Tooth Gingiva Segmentation Contour In step 130, the method comprises obtaining data of a tooth gingiva segmentation contour 1002.

Figure 10:
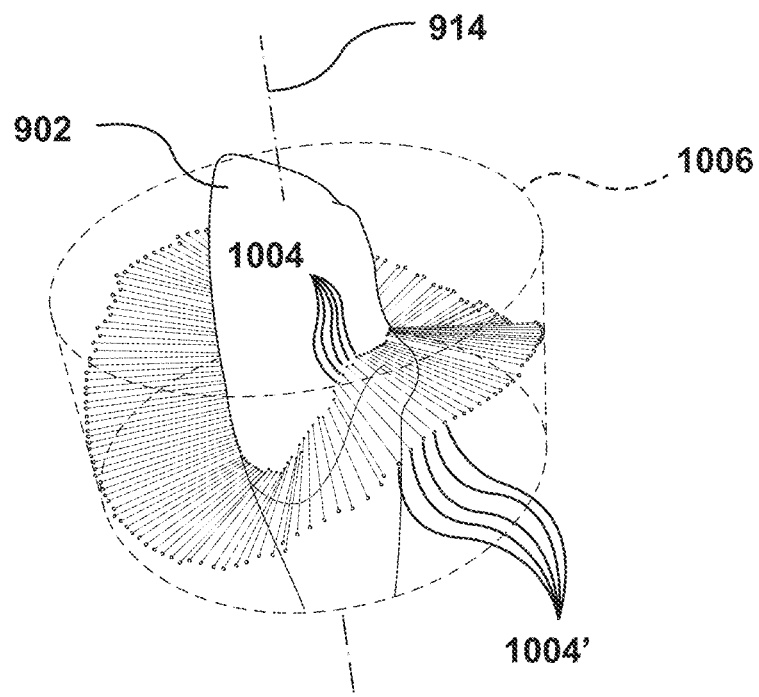
FIG. 10 depicts a schematic diagram of a portion of the preliminary 3D digital model of the given tooth of FIG. 9 with a reference cylinder therearound, according to certain non-limiting embodiments of the present technology.
Figure 11:
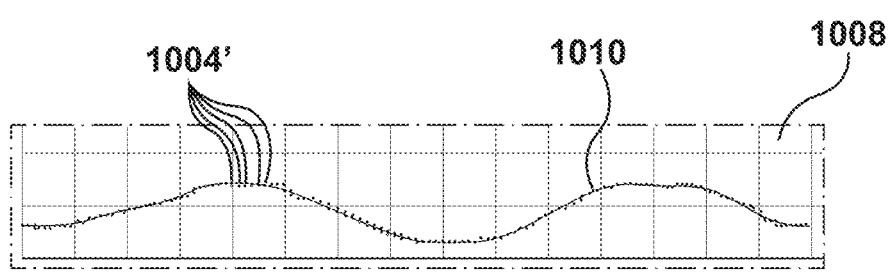
FIG. 11 depicts the reference cylinder of FIG. 10 converted into a 2D plane, according to certain non-limiting embodiments of the present technology.
Figure 12:
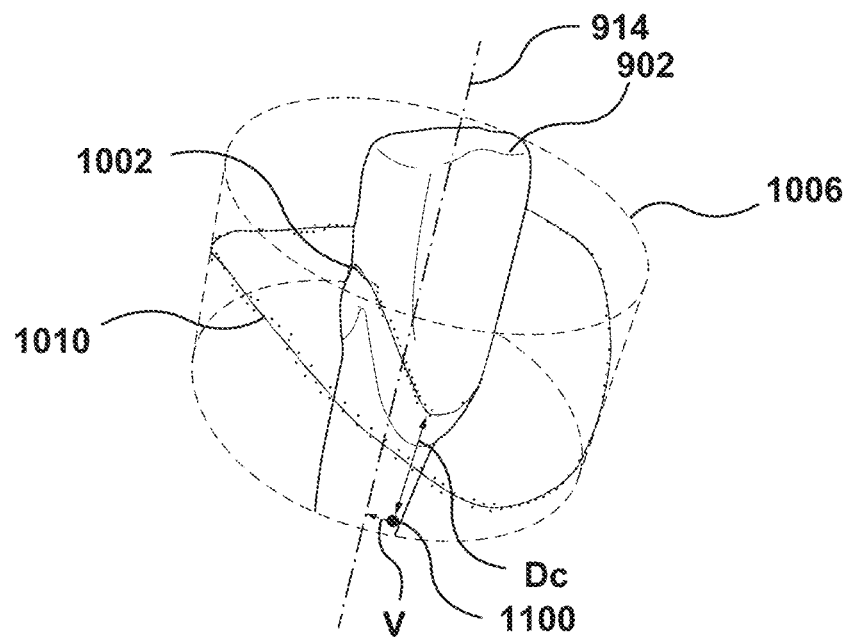
FIG. 12 depicts a schematic diagram of the preliminary 3D digital model of the given tooth and the reference cylinder of FIG. 10, with a tooth gingiva segmentation contour being shown on the preliminary 3D digital model of the given tooth, according to certain non-limiting embodiments of the present technology.
Figure 13:
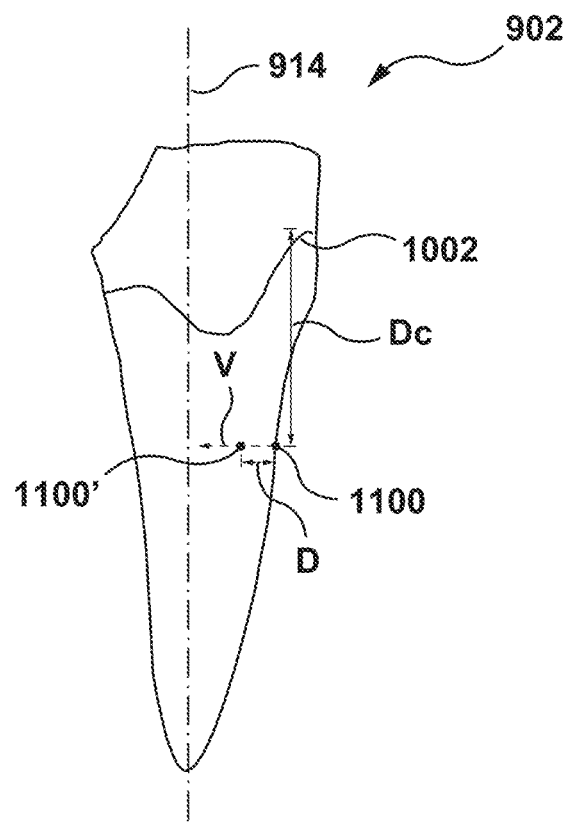
FIG. 13 depicts a schematic diagram from the side of the preliminary 3D digital model, according to certain non-limiting embodiments of the present technology.

With reference to FIGS. 10 to 12, in some embodiments, the tooth gingiva segmentation contour 1002 is determined by (i) identifying on the preliminary tooth 3D digital model 902, isolated vertices 1004 (only some of which are labelled in FIG. 10) which are connected to a single mesh element, (ii) projecting the isolated vertices 1004 onto a surface of a reference cylinder 1006 formed around the longitudinal axis 914 of the given tooth in the preliminary tooth 3D digital model, thereby obtaining projected isolated vertices 1004', (iii) converting the reference cylinder 1006 to a reference plane 1008 in two-dimensions, (iv) generating a curve 1010 through the projected isolated vertices 1004' in the reference plane, and (v) projecting the curve 1010 onto the surface of the preliminary tooth 3D digital model, and determining the projected curve as the tooth gingiva segmentation contour 1002.

In some embodiments, converting the reference cylinder 1006 to the reference plane 1008 includes unfolding the reference cylinder 1006.

In other embodiments, converting the reference cylinder 1006 to the reference plane 1008 includes assigning a coordinate to each isolated vertex 1004 in a coordinate system of the reference cylinder 1006, and converting the coordinate to a 2D cartesian coordinate system. The coordinate of each of the isolated vertices 1004 includes an angle relative to the longitudinal axis 914, and a distance value of a closest point on the longitudinal axis 914 to the given isolated vertex 1004.

It is to be noted that once the tooth gingiva segmentation contour 1002 is projected onto the preliminary tooth 3D digital model 902, all vertices disposed vertically above the tooth gingiva segmentation contour 1002 can be considered as being part of the crown portion 906, and all vertices disposed vertically below the tooth gingiva segmentation contour 1002 can be considered as being part of the root portion 908.

It is not limited how the processor 550 can be configured to obtain the data for the tooth gingiva segmentation contour 1002, such that in some embodiments, a gingiva 3D digital model, which can help to define the tooth gingiva segmentation contour, can be reconstructed from the arch form 3D digital model 602; and in specific non-limiting embodiments of the present technology, the processor 550 can be configured to apply an approach described in a co-owned U.S. Pat. No. 10,945,812-B1 issued on Mar. 16, 2021, entitled "SYSTEMS AND METHODS FOR PLANNING AN ORTHODONTIC TREATMENT", content of which is incorporated herein by reference in its entirety.

More specifically, to generate the gingiva 3D digital model of the lower gingiva 14 according to these embodiments, the processor 550 can be configured to: (i) acquire the arch form 3D digital model 602 of the lower arch form 10 of the subject, the arch form 3D digital model 602 including data of a transverse plane associated with a skull of the subject; the transverse plane being associated with a common median axis lying therein and a common vertical axis perpendicular thereto; (ii) segment, in the arch form 3D digital model 602, associated representations of the lower teeth 12 and the lower gingiva 14 to generate a plurality of segmentation loops, each segmentation loop being respectively associated with each tooth of the lower teeth 12 and representing an interface therebetween and the lower gingiva 14; (iii) determine, between each adjacent two segmentation loops of the plurality of segmentation loops, a midpoint, thereby generating a plurality of primary midpoints for the plurality of segmentation loops; (iv) based on the plurality of midpoints, generate a primary central curve; (v) generate, based on the primary central curve, a first inner mesh curve and a first outer mesh curve, the first inner mesh curve positioned along a first horizontal plane and the first outer mesh curve positioned along a second horizontal plane, both the first horizontal plane and the second horizontal plane being parallel to the transverse plane and being vertically offset, along the common vertical axis, from a highest vertex of the plurality of segmentation loops; the first inner mesh curve being offset along the common median axis posteriorly relative to the primary central curve along the first horizontal plane; and the first outer mesh curve being offset along the common median axis anteriorly relative to the primary central curve along the second horizontal plane; (vi) project the plurality of primary midpoints onto the first inner mesh curve and the first outer mesh curve, thereby generating a first plurality of inner midpoints and a first plurality of outer midpoints; and (vii) generating a first segment of the gingiva 3D digital model (not depicted) of the lower gingiva 14 by joining each one from the plurality of primary midpoints with respective ones from the first plurality of inner midpoints and from the first plurality of outer midpoints.

Similarly, in alternative non-limiting embodiments of the present technology, rather than generating the gingiva 3D digital model of the lower gingiva 14 based on the arch form 3D digital model 602, the processor 550 may be configured to receive the gingiva 3D digital model of the lower gingiva 14 from one of the solid-state drive 560 and the random-access memory 570, or via the input/output interface 580.

The method 100 is then configured to determine for each of the root vertices, a respective new position relative to the longitudinal axis 914 where the respective new position is defined by a shift distance value D and a shift direction vector V. By modifying distances between each of the root vertices and the longitudinal axis 914, a more anatomically accurate form of the root portion can be determined.

Thus, the step 130 terminates.

The following steps will be described with reference to a given root vertex 1100, though it is understood that each step is repeated for all root vertices unless explicitly indicated otherwise.

Step 140: Determining, Along a Closest Distance from a Given Root Vertex to the Longitudinal Axis, a Shift Direction Vector Referring to FIGS. 12 and 13, in step 140, the method 100 comprises determining the shift direction vector V which is oriented along a closest distance from the given root vertex 1100 to the longitudinal axis 914.

The step 140 thus terminates.

Step 150: Determining a Longitudinal Distance from the Given Root Vertex to the Crown-Root Border Still referring to FIGS. 12 and 13, in step 150, the method 100 comprises determining a longitudinal distance $D_a$ from the given root vertex 1100 to the tooth gingiva segmentation contour 1002 (i.e., the longitudinal distance is measured along the longitudinal axis 914).

The step 150 thus terminates.

Step 160: Determining the Shift Distance Value of the Given Root Vertex Relative to the Longitudinal Axis In step 160, the method 100 comprises determining the shift distance value D of the given root vertex 1100 relative to the longitudinal axis 914, based on the longitudinal distance $D_c$ between the given root vertex 1100 and the tooth gingiva segmentation contour 1002. Generally, as the longitudinal distance $D_c$ between the given root vertex 1100 and the tooth gingiva segmentation contour 1002 increases, the shift distance value D decreases.

In some embodiments, the shift distance value D for the given root vertex 1100 can be modulated by applying a weight thereto. As such, the respective shift distance value D of each of the root vertices can be modulated by applying a respective weight value thereto, where the weight value changes from one root vertex to another. If there are any vertices of the root portion 908 that should not be shifted, then a weight value of 0 can be assigned thereto. In some instances, the weight value assigned to each one of the root vertices can decrease along the longitudinal axis 914 as a distance between the root vertex and the tooth gingiva segmentation contour 1002 increases.

In some embodiments, the method 100 can further include modulating the shift distance value D by a constant A and a respective weight value $W_v$. Specifically, the modulation can be governed by the following equation: $D=D_a A W_v$, where $D_a$ is the closest distance from the given root vertex 1100 to the longitudinal axis 914, A is a constant indicative of a magnitude of the shift distance value D, and $W_v$ is the respective weight value to be assigned to the given root vertex 1100.

In some embodiments, the constant A generally corresponds to an amplitude of a translation of the given vertex 1100. The constant A can be measured in percentage value. In some instances, the predetermined constant A could be measured as a decimal fraction of 1 (i.e., between 0.00 to 1.00). In some instances, the constant A can depend on characteristics of the given lower tooth 16. For instance, the constant A can vary from one tooth to another, based on a volume thereof or based on a size of the tooth gingiva segmentation contour 1002. In other instances, the constant A could vary based on a portion of a tooth. In other embodiments, the constant A can be a discrete value that is predetermined for a given set of teeth (e.g., given constant A for all molars). In some implementations, the constant A can define amount of translation of a given vertex. In some examples, the constant A can be 0.25, 0.5 or 0.75.

In some embodiments, the weight value $W_v$ is a first weight value $W_{v1}$ that can be determined according to the following equation:

$$W_{v1} = 1 - \frac{D_c}{LB},$$

where $D_C$ is the longitudinal distance from the given root vertex 1100 to the tooth gingiva segmentation contour 1002, L is a total length of the given lower tooth 16, and B is a predetermined constant indicative of a desired level of a falloff transition between the crown portion 906 and the root portion 908.

In some embodiments, the length L of the given tooth is measured along the longitudinal tooth axis 914.

In some embodiments, the predetermined constant B is referred to as: "balance" parameter. The predetermined constant B can be measured in percentage value. In some instances, the predetermined constant B could be measured as a decimal fraction of 1 (i.e., between 0.00 to 1.00). In some embodiments, the predetermined constant B defines the virtual separation between the root and the crown, and indicates what portion of the tooth corresponds to the root portion. If all vertices were to be projected on the longitudinal axis, a lowermost vertex of the root portion 908 would be located at 0% and a highest vertex of the crown portion 906 would be located at 100%. In some embodiments, the predetermined constant B could be based on a type of the given tooth (e.g., molar or canine) In some embodiments, the predetermined constant B can be about 0.3, 07 or 0.9.

In other embodiments, the weight value $W_v$ is a second weight value $W_{v2}$ that can be determined according to the following equation $$W_{v2} = \frac{\frac{1}{1+e^{-D_c}} + 2\pi}{4\pi},$$

where, as mentioned above, $D_C$ is the longitudinal distance from the given root vertex to the crown-root border.

In yet other embodiments, the method 100 includes modulating the shift distance value by a lesser one of the first and second weight values $W_{v1}$, $W_{v2}$. The lesser one of the first and second weight values $W_{v1}$, $W_{v2}$ is used, because it can assist in smoothening out the root portion. Thus, the weight acts as a multiplier of the translation that is to be applied to a given vertex.

Applying a weight value to the shift distance value may provide a more accurate augmented tooth model, in certain embodiments.

The step 160 thus terminates.

Step 170: Moving the Given Root Vertex to the Respective New Position by Applying the Shift Distance Value Along the Shift Direction Vector In step 170, the method 100 comprises moving the given root vertex 1100 to the respective new position by applying the shift distance value D along the shift direction vector V. The respective new position is labelled as root vertex 1100' in FIG. 13.

Once all of the root vertices have been moved to their respective new position, an augmented tooth 3D model 1202 is generated, as shown in FIG. 14.

The step 170 thus terminates.

Step 180: Storing the Augmented Tooth 3D Digital Model for Further Use in Determining an Orthodontic Treatment for the Subject In step 180, the method 100 comprises storing the augmented tooth 3D model 1202.

As noted above, in some non-limiting embodiments of the present technology, the system 400 may be configured, based on the augmented tooth 3D model 1202, determine the orthodontic treatment for the subject including forces to be applied onto the at least some of the lower teeth 12 to cause them to move to their respective target positions corresponding to the desired occlusion between the lower and the upper teeth 12, 13. In specific non-limiting embodiments of the present technology, the orthodontic treatment may be determined (for example, by a processor 550 depicted in FIG. 5) as described in a co-owned U.S. Pat. No. 10,993,782-B1 issued on May 4, 2021, and entitled "SYSTEMS AND METHODS FOR DETERMINING A TOOTH TRAJECTORY", a content of which is hereby incorporated by reference in its entirety.

In other embodiments, after thermoforming an unfinished aligner based on the determined orthodontic treatment, the system 400 can be configured to trim excess material of the unfinished aligned along a cut line to produce an edge of the aligner 20.

To that end, in some non-limiting embodiments of the present technology, the system 400 can be configured to determine (or otherwise receive) data indicative of the cut line and mark the cut line on the unfinished aligner. To that end, the system 400 may further comprise a marking subsystem. It is not limited how the marking subsystem may be implemented; however, in various non-limiting embodiments of the present technology, the marking subsystem may include a marking head for applying the cut line onto the unfinished aligner and a first robotic arm (not depicted) for holding and manipulating the unfinished aligner (not depicted) around the marking head. In some non-limiting embodiments of the present technology, the marking head may further comprise a coloring material storage (not depicted) for storing a coloring material (such as ink, as an example) and a supply control block (not depicted). In some non-limiting embodiments of the present technology, the marking head may be implemented as a laser apparatus configurable to scorch the cut line (not depicted) on the unfinished aligner (not depicted).

In certain non-limiting embodiments of the present technology, the system 400 may further be configured to detect the cut line applied on the unfinished aligner and cut along the cut line to produce the aligner 20. In this regard, the system 400 may further comprise a forming subsystem. In some non-limiting embodiments of the present technology, the forming subsystem may include a second robotic arm (not depicted), at an end-effector of which there is installed a camera device.

In some non-limiting embodiments of the present technology, the camera device can be any appropriate digital camera configured to detect the cut line applied by the marking subsystem described above onto the unfinished aligner, including, for example, but not limited to, a coupled-charged device camera (a CCD camera). Further, as mentioned above, the forming subsystem may include the cutting device. Non limiting examples of the cutting device may include a laser-based cutting device, a mechanical cutting device such as using a blade with a rotary or linear cutting action, and a water-jet based cutting device, as an example.

In some non-limiting embodiments of the present technology, both the marking subsystem and the forming subsystem of the system may be implemented as described in a co-owned U.S. patent application Ser. No. 16/704,718 filed on Dec. 5, 2019, entitled "SYSTEMS AND METHODS FOR FORMING PERSONALIZED DENTAL APPLIANCES", the content of which is hereby incorporated by reference in its entirety.

Thus, the forming subsystem may be configured to: (1) cause the camera device to move around the unfinished aligner (not depicted) with the cut line (not depicted) applied thereon to detect the cut line and generating respective image data thereof; (2) receive the image data of the cut line; and (3) based on the received image data of the cut line, cause cutting, by the cutting device the unfinished aligner along the cut line, thereby forming the aligner 20.

In other non-limiting embodiments of the present technology, the forming subsystem may be configured for cutting the unfinished aligner without requiring detection of the cut line. Instead, the determined cut line is used to guide the cutting—for example, based on received data indicative of a position of the cut line within the unfinished aligner. In some non-limiting embodiments of the present technology, the data indicative of the position of the cut line within the unfinished aligner may include at least one of: Cartesian coordinates; angular data indicative of a cutting angle for cutting the unfinished aligner; and a distance from the cutting device, as an example.

According to certain non-limiting embodiments of the present technology, the processor 550 can be configured to store the data of the augmented tooth 3D model 1202, such as in the solid-state drive 560 of the system 400, for further use in manufacturing the aligner 20.

Further, in some non-limiting embodiments of the present technology, the processor 550 can be configured to cause a manufacturing system to produce the aligner 20 in accordance with the treatment determined thanks to the augmented tooth 3D model 1202. More specifically, in those embodiments where the manufacturing system is a thermoforming system, an aligner mold can be produced.

In those embodiments where the manufacturing system is an additive manufacturing system, the processor 550 can be configured to cause direct 3D-printing of the aligner 20.

The method 100 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an augmented tooth 3D digital model of a given tooth of a subject, the method being executable by a processor, the method comprising:

obtaining, by the processor, a preliminary tooth 3D digital model of the given tooth, the preliminary tooth 3D digital model comprising crown vertices representative of a crown surface of a crown portion of the given tooth and root vertices representative of a root surface of a root portion of the given tooth, the crown vertices having been obtained from image data of the crown portion of the given tooth, and the root vertices being an approximation of the root portion;

generating, by the processor, the augmented tooth 3D digital model from the preliminary tooth 3D digital model:

obtaining, by the processor, data of a longitudinal axis of the given tooth;

obtaining, by the processor, data indicative of a tooth gingiva segmentation contour between the crown portion and the root portion of the given tooth;

determining, by the processor, for each root vertex, a respective new position relative to the longitudinal axis, the respective new position being defined by a shift distance value and a shift direction vector, the determining comprising, for a given root vertex:

determining, along a closest distance to the longitudinal axis therefrom, the shift direction vector;

determining a longitudinal distance from the given root vertex to the tooth gingiva segmentation contour; and determining based on the longitudinal distance from the given root vertex to the tooth gingiva segmentation contour, the shift distance value of the given root vertex relative to the longitudinal axis;

moving, by the processor, for each of the root vertices, the given root vertex to the respective new position by applying the shift distance value along the shift direction vector to generate the augmented tooth 3D digital model; and storing, by the processor, the augmented tooth 3D digital model for further use in determining an orthodontic treatment for the subject.

2. The method of claim 1, wherein before applying the shift distance value along the shift direction vector, the method further comprises applying a weight to the shift distance value.

3. The method of claim 1, wherein before applying the shift distance value along the shift direction vector, the method further comprises modulating the shift distance value by a constant A and a respective weight value $W_v$, according to the following equation:

$$D = D_a A W_v,$$

where $D_a$ is the closest distance from the given root vertex to the longitudinal axis;

A is a constant indicative of a magnitude of the shift distance value; and $W_v$ is the respective weight value to be assigned to the given root vertex.

4. The method of claim 3, wherein the respective weight value is a first weight value, $W_{v1}$, and is determined according to:

$$W_{v1} = 1 - \frac{D_c}{LB}$$

where $D_C$ is the longitudinal distance from the given root vertex to the tooth gingiva segmentation contour, L is a total length of the given tooth, and B is a predetermined constant indicative of a desired level of a falloff transition between the crown portion and the root portion.

5. The method of claim 3, wherein the respective weight value is a second weight value, $W_{v2}$, and is determined according to:

$$W_{v2} = \frac{\frac{1}{1+e^{-D_c}} + 2\pi}{4\pi}$$

where $D_C$ is the longitudinal distance from the given root vertex to the tooth gingiva segmentation contour.

6. The method of claim 1, wherein before applying the shift distance value along the shift direction vector to the given root vertex, the method further comprises applying a lesser of a first weight value and a second weight value to the shift distance value, wherein the first weight value, $W_{v1}$, is determined according to:

$$W_{v1} = 1 - \frac{D_c}{LB}$$

where $D_C$ is the longitudinal distance from the given root vertex to the tooth gingiva segmentation contour,
L is a total length of the given tooth, and
B is a predetermined constant indicative of a desired level of a falloff transition between the crown portion and the root portion; and wherein the second weight, $W_{v2}$, is determined according to:

$$W_{v2} = \frac{\frac{1}{1+e^{-D_c}} + 2\pi}{4\pi}.$$

7. The method of claim 1, further comprising generating the preliminary tooth 3D digital model of the given tooth by:
obtaining a crown 3D digital model of the crown portion of the given tooth, and
merging the crown 3D digital model with a root 3D digital model of the root portion of the given tooth, the root 3D digital model being selected according to a tooth type of the given tooth.

8. The method of claim 1, further comprising re-distributing the crown vertices and the root vertices of the preliminary tooth 3D digital model uniformly across the crown surface and the root surface.

9. The method of claim 1, further comprising determining the tooth gingiva segmentation contour by:
identifying, on the preliminary tooth 3D digital model, isolated vertices which are connected to a single mesh element;
projecting the isolated vertices onto a surface of a reference cylinder formed around the longitudinal axis of the preliminary tooth 3D digital model;
converting the reference cylinder to a reference plane in two-dimensions;
generating a curve through the projected isolated vertices in the reference plane; and
projecting the curve onto the surface of the preliminary tooth 3D digital model, and determining the projected curve as the tooth gingiva segmentation contour.

10. The method of claim 9, wherein the converting the reference cylinder to the reference plane comprises:
assigning a coordinate to each isolated vertex in a coordinate system of the reference cylinder, the coordinate comprising an angle relative to the longitudinal axis and a distance value of a closest point on the longitudinal axis to the given isolated vertex; and
converting the coordinate to a 2D cartesian coordinate system.

11. A system for generating an augmented tooth 3D digital model of a given tooth of a subject, the system comprising a processor configured to:
obtain a preliminary tooth 3D digital model of the given tooth, the preliminary tooth 3D digital model comprising crown vertices representative of a crown surface of a crown portion of the given tooth and root vertices representative of a root surface of a root portion of the given tooth,
the crown vertices having been obtained from image data of the crown portion of the given tooth, and
the root vertices being an approximation of the root portion;
generate the augmented tooth 3D digital model from the preliminary tooth 3D digital model:
obtain data of a longitudinal axis of the given tooth;
obtain data indicative of a tooth gingiva segmentation contour between the crown portion and the root portion of the given tooth;
determine for each root vertex, a respective new position relative to the longitudinal axis, the respective new position being defined by a shift distance value and a shift direction vector, the determining comprising, for a given root vertex:
determine along a closest distance to the longitudinal axis therefrom, the shift direction vector;
determine a longitudinal distance from the given root vertex to the tooth gingiva segmentation contour; and
determine based on the longitudinal distance from the given root vertex to the tooth gingiva segmentation contour, the shift distance value of the given root vertex relative to the longitudinal axis;
move for each of the root vertices, the given vertex to the respective new position by applying the shift distance value along the shift direction vector to generate the augmented tooth 3D digital model; and
store the augmented tooth 3D digital model for further use in determining an orthodontic treatment for the subject.

12. The system of claim 11, wherein the processor is configured to, before applying the shift distance value along the shift direction vector to the given vector, apply a weight to the shift distance value.

13. The system of claim 11, wherein the processor is configured to, before applying the shift distance value along the shift direction vector to the given vector, modulate the shift distance value by a constant A and a respective weight value $W_v$, according to the following equation:

$$D=D_a A W_v,$$

where $D_a$ is the closest distance from the given root vertex to the longitudinal axis;
A is a constant indicative of a magnitude of the shift distance value; and
$W_v$ is the respective weight value to be assigned to the given root vertex.

14. The system of claim 13, wherein the respective weight value is a first weight value, $W_{v1}$, and is determined according to:

$$W_{v1} = 1 - \frac{D_c}{LB}$$

where $D_C$ is the longitudinal distance from the given root vertex to the tooth gingiva segmentation contour,
L is a total length of the given tooth, and
B is a predetermined constant indicative of a desired level of a falloff transition between the crown portion and the root portion.

15. The system of claim 13, wherein the respective weight value is a second weight value, $W_{v2}$, and is determined according to:

$$W_{v2} = \frac{\frac{1}{1+e^{-D_c}} + 2\pi}{4\pi}$$

where $D_C$ is the longitudinal distance from the given root vertex to the tooth gingiva segmentation contour.

16. The system of claim 11, wherein the processor is configured to, before applying the shift distance value along the shift direction vector to the given root vertex, apply a lesser of a first weight value and a second weight value to the shift distance value,
wherein the first weight value, $W_{v1}$, is determined according to:

$$W_{v1} = 1 - \frac{D_c}{LB}$$

where $D_C$ is the longitudinal distance from the given root vertex to the tooth gingiva segmentation contour,
L is a total length of the given tooth, and
B is a predetermined constant indicative of a desired level of a falloff transition between the crown portion and the root portion; and
wherein the second weight, $W_{v2}$, is determined according to:

$$W_{v2} = \frac{\frac{1}{1+e^{-D_c}} + 2\pi}{4\pi}.$$

17. The system of claim 11, wherein the processor is further configured to generate the preliminary tooth 3D digital model of the given tooth by:
obtaining a crown 3D digital model of the crown portion of the given tooth, and
merging the crown 3D digital model with a root 3D digital model of the root portion of the given tooth, the root 3D digital model being selected according to a tooth type of the given tooth.

18. The system of claim 11, wherein the processor is further configured to re-distribute the crown vertices and the root vertices of the preliminary tooth 3D digital model uniformly across the crown surface and the root surface.

19. The system of claim 11, wherein the processor is further configured to determine the tooth gingiva segmentation contour by:
identifying, on the preliminary tooth 3D digital model, isolated vertices which are connected to a single mesh element;
projecting the isolated vertices onto a surface of a reference cylinder formed around the longitudinal axis of the preliminary tooth 3D digital model;
converting the reference cylinder to a reference plane in two-dimensions;
generating a curve through the projected isolated vertices in the reference plane; and
projecting the curve onto the surface of the preliminary tooth 3D digital model, and determining the projected curve as the tooth gingiva segmentation contour.

20. The system of claim 19, wherein the converting the reference cylinder to the reference plane comprises:
assigning a coordinate to each isolated vertex in a coordinate system of the reference cylinder, the coordinate comprising an angle relative to the longitudinal axis and a distance value of a closest point on the longitudinal axis to the given isolated vertex; and
converting the coordinate to a 2D cartesian coordinate system.

* * * * *